US012669004B1

(12) United States Patent
Liang et al.

(10) Patent No.: US 12,669,004 B1
(45) Date of Patent: Jun. 30, 2026

(54) WINDOW BALANCE ASSEMBLY WITH IMPROVED MOUNTING BRACKET AND CURL SPRING ATTACHMENT

(71) Applicant: Vision Industries Group, Inc., Somerset, NJ (US)

(72) Inventors: Luke Liang, Somerset, NJ (US); David Chen, Guangzhou (CN)

(73) Assignee: Vision Industries Group, Inc., Somerset, NJ (US)

(*) Notice: Subject to any disclaimer, the term of this patent is extended or adjusted under 35 U.S.C. 154(b) by 117 days.

(21) Appl. No.: 18/363,110

(22) Filed: Aug. 1, 2023

Related U.S. Application Data

(60) Provisional application No. 63/514,159, filed on Jul. 18, 2023.

(51) Int. Cl.
*E05D 13/00* (2006.01)

(52) U.S. Cl.
CPC ................................ *E05D 13/1276* (2013.01)

(58) Field of Classification Search
CPC .. E05D 13/1276; E05D 13/1292; E05D 15/22
See application file for complete search history.

(56) References Cited

U.S. PATENT DOCUMENTS

| | | |
|---|---|---|
| 16,228 A | 12/1856 | Copeland |
| 30,408 A | 10/1860 | Judd |
| 36,524 A | 9/1862 | Minor |
| 51,222 A | 11/1865 | Ridell |
| 108,778 A | 11/1870 | Gorman |
| 115,781 A | 6/1871 | Steele |

(Continued)

FOREIGN PATENT DOCUMENTS

| | | |
|---|---|---|
| GB | 2 286 627 | 8/1995 |
| GB | 2 461 079 | 12/2009 |

(Continued)

OTHER PUBLICATIONS

Press Fit Forces Stress Design Calculator, Jun. 18, 2018, available at: www.engineersedge.com/calculators/machine-design/press-fit/press-fit.htm.

(Continued)

*Primary Examiner* — Jeffrey O'Brien
(74) *Attorney, Agent, or Firm* — Thomas A. O'Rourke; James Bongiorno; O'Rourke IP Law, PLLC

(57) ABSTRACT

A window balance assembly includes: a housing with first and second interior spaces; a receiver rotatably supported in the first interior space; a curl spring disposed in the second interior space with a tail extending out of the housing; and a mounting bracket. The tail includes: a neck and a head. The mounting bracket includes first and second flanges. First and second guide members protrude from opposite sides of a rear surface of the first flange, and slidably support the tail proximate to the rear surface. First and second ramp members on the rear surface include an upper recess, and are spaced permitting passage of the neck therebetween. When the tail slides between the second guide members the ramp members force the head away from the rear surface, until the head passes beyond the ramp members. The curl spring biases the head into the recesses.

12 Claims, 12 Drawing Sheets

(56) References Cited

U.S. PATENT DOCUMENTS 126,872 A 5/1872 Buckman
148,857 A 3/1874 Smith
163,008 A 5/1875 Gillespie
166,842 A 8/1875 Berryman
178,360 A 6/1876 Cooper
190,074 A 4/1877 Penfield
192,614 A 7/1877 Andrews
192,919 A 7/1877 Hoyt
201,146 A 3/1878 Adler
226,033 A 3/1880 Burns
230,476 A 7/1880 Green
234,387 A 11/1880 Burgess
284,993 A 9/1883 Abele
314,350 A 3/1885 Smith
316,285 A 4/1885 McKeen
331,005 A 11/1885 Sahr
336,302 A 2/1886 Dudgeon
346,788 A 8/1886 Teufel
350,678 A 10/1886 Hussey
353,287 A 11/1886 Chumard
368,595 A 8/1887 King
369,885 A 9/1887 Shaw
375,656 A 12/1887 Shaw
376,252 A 1/1888 Mcintyre
379,910 A 3/1888 Rosentreter
410,728 A 9/1889 Brown
417,868 A 12/1889 Janes
423,761 A 3/1890 Hasenpflug
426,303 A 4/1890 McGovern
447,068 A 2/1891 Dixan
452,723 A 5/1891 Schmalhausen
471,363 A 3/1892 Sloan
480,148 A 8/1892 Theby
493,159 A 3/1893 Gibson
509,941 A 12/1893 Perry
512,593 A 1/1894 Webster
520,754 A 5/1894 Burmeister
526,118 A 9/1894 Sharp
528,656 A 11/1894 Burmeister
530,078 A 12/1894 Ammerman
532,935 A 1/1895 Woolery
534,185 A 2/1895 Winchester
537,258 A 4/1895 Wilcox
539,030 A 5/1895 Bitner
551,181 A 12/1895 Dillon
551,242 A 12/1895 Wallace
554,448 A 2/1896 Keil
564,426 A 7/1896 Hubbard
572,591 A 12/1896 Woodard
587,424 A 8/1897 Bonine
590,225 A 9/1897 Hill
653,458 A 7/1900 Paquette
666,596 A 1/1901 Breen
683,928 A 10/1901 Geraghty
688,491 A 12/1901 Sigler
695,736 A 3/1902 Kendrick
698,742 A 4/1902 Scharnweber
699,696 A 5/1902 Mellen
708,406 A 9/1902 Robison
714,343 A 11/1902 Wellman
718,007 A 1/1903 Linn
719,981 A 2/1903 Adams
722,162 A 3/1903 St. Louis
724,466 A 4/1903 Hannan
743,716 A 11/1903 Hadka
744,755 A 11/1903 Hasenpflug
745,888 A 12/1903 McElwee
749,469 A 1/1904 Assorati
756,453 A 4/1904 Arens
756,559 A 4/1904 Arens
757,249 A 4/1904 Barnard
759,642 A 5/1904 Sparks
764,493 A 7/1904 Noseworthy
769,386 A 9/1904 Johnson
769,767 A 9/1904 Phelps
774,536 A 11/1904 Saunders
775,602 A 11/1904 Hearnshaw
800,043 A 9/1905 Witte
804,994 A 11/1905 Andrews
815,537 A 3/1906 Kissinger
833,900 A 10/1906 Sigler
837,811 A 12/1906 Ebbeson
840,427 A 1/1907 Brister
865,090 A 9/1907 Eddy
866,073 A 9/1907 Saunders
878,206 A 2/1908 Johnson
881,658 A 3/1908 Bowman
886,108 A 4/1908 Allen
887,690 A 5/1908 Pearce
897,719 A 9/1908 Daubaignan
900,079 A 10/1908 Bittorf
910,850 A 1/1909 Petrie
913,730 A 3/1909 Kapus
922,894 A 5/1909 Heid
926,899 A 7/1909 Roy
928,408 A 7/1909 Taube
948,628 A 2/1910 Jefferis
959,150 A 5/1910 Morris
963,983 A 7/1910 Bernhard
966,063 A 8/1910 Toothaker
976,777 A 11/1910 Brown
980,131 A 12/1910 Shean
998,642 A 7/1911 Shean
1,003,386 A 9/1911 Welker
1,006,211 A 10/1911 Hermon
1,020,454 A 3/1912 Seidenbecker
1,041,803 A 10/1912 Kilburn
1,051,918 A 2/1913 Rowley
1,059,999 A 4/1913 James
1,069,079 A 7/1913 Voight
1,077,487 A 11/1913 Miller
1,080,172 A 12/1913 Rusk
1,100,820 A 6/1914 Edwards
1,121,228 A 12/1914 Burkhart
1,122,026 A 12/1914 O’Rourke
1,127,835 A 2/1915 Westlund
1,133,217 A 3/1915 Barton
1,141,437 A 6/1915 Unterlender
1,148,712 A 8/1915 Overland
1,163,086 A 12/1915 Harper
1,173,129 A 2/1916 Taliaferro
1,177,637 A 4/1916 Lane
1,177,838 A 4/1916 Wilkinson
1,207,989 A 12/1916 O’Rourke
1,232,683 A 7/1917 Holllis
1,243,115 A 10/1917 Shur
1,244,725 A 10/1917 Gadke
1,253,810 A 1/1918 Gianninoto
1,261,274 A 4/1918 Newsam
1,269,467 A 6/1918 Winters
1,270,740 A 6/1918 Keyes
1,272,900 A 7/1918 Berman
1,279,353 A 9/1918 Kelley
1,311,052 A 7/1919 Danforth
1,322,677 A 11/1919 Ditlefsen
1,338,250 A 4/1920 Parkes
1,338,416 A 4/1920 Bellinger
1,339,362 A 5/1920 L’Heureux
1,341,234 A 5/1920 Horton
1,350,698 A 8/1920 Boedtcher
1,387,302 A 8/1921 Page
1,388,272 A 8/1921 Lawrence
1,393,628 A 10/1921 Leichter
1,398,174 A 11/1921 Carlson
1,399,897 A 12/1921 Singer
1,412,154 A 4/1922 Wollesen
1,439,585 A 12/1922 Trost
1,461,467 A 7/1923 Stuart
1,463,866 A 8/1923 Bourbeau
1,470,858 A 10/1923 Maxwell
1,485,382 A 3/1924 Foley
1,490,874 A 4/1924 Webb
1,516,995 A 11/1924 Trigueiro
1,550,532 A 8/1925 French

(56) References Cited

U.S. PATENT DOCUMENTS 1,552,690 A 9/1925 Frantz
1,587,037 A 6/1926 Rudolph
1,601,051 A 9/1926 Wilbert
1,605,717 A 11/1926 Gregg
1,619,031 A 3/1927 Ostrosky
1,622,742 A 3/1927 Shipman
1,656,818 A 1/1928 Dillon
1,692,579 A 11/1928 Schrader
1,704,946 A 3/1929 Lindgren
1,712,792 A 5/1929 Hansen
1,715,957 A 6/1929 Stein
1,724,637 A 8/1929 Bergstrom
1,750,715 A 3/1930 Jeffers
1,794,171 A 2/1931 Grutel
1,812,288 A 6/1931 Drapeau
1,819,824 A 8/1931 McAllister
1,864,253 A 6/1932 Mcintyre
1,869,274 A 7/1932 Phillips
1,877,177 A 9/1932 Hinderer
1,891,940 A 12/1932 McAllister
1,900,936 A 3/1933 Huttger
1,901,974 A 3/1933 Macy
1,918,114 A 7/1933 Lorenzen
1,922,062 A 8/1933 Sullivan
1,940,084 A 12/1933 Grasso
1,960,034 A 5/1934 Stewart
1,964,114 A 6/1934 Gerlach
2,095,057 A 10/1937 Corrado
2,122,661 A 7/1938 Rightmyer
2,126,995 A 8/1938 Kingdon
2,136,408 A 11/1938 Bedell
2,158,260 A 5/1939 Stillman
2,202,561 A 5/1940 Lahiere
2,232,965 A 2/1941 Perl
2,272,145 A 2/1942 Anderson
2,326,084 A 8/1943 Westrope
2,369,584 A 2/1945 Lundholm
2,452,521 A 10/1948 Johnson
2,480,016 A 8/1949 Granberg
2,480,988 A 9/1949 Walton
2,500,349 A 3/1950 Menns
2,503,370 A 4/1950 Zanona
2,523,559 A 9/1950 Couture
2,527,278 A 10/1950 Schemansky
2,537,736 A 1/1951 Carlson
2,560,274 A 7/1951 Cantelo
2,581,816 A 1/1952 Schlueter
2,590,624 A 3/1952 James
2,599,196 A 6/1952 Peremi
2,605,125 A 7/1952 Emerson
2,612,398 A 9/1952 Miller
2,613,526 A 10/1952 Holmsten
2,621,951 A 12/1952 Ostadal
2,645,515 A 7/1953 Thomas
2,648,967 A 8/1953 Holmsten
2,670,982 A 3/1954 Banham
2,692,789 A 10/1954 Rivard
2,732,594 A 1/1956 Adams
2,735,707 A 2/1956 Sylvan
2,739,344 A 3/1956 Dickinson
2,758,862 A 8/1956 Endter
2,766,492 A 10/1956 Day
2,789,851 A 4/1957 Lickteig
2,818,919 A 1/1958 Sylvan
2,846,258 A 8/1958 Granberg
2,855,772 A 10/1958 Hillgren
2,884,276 A 4/1959 Baptist
2,920,914 A 1/1960 Jenkins
2,941,832 A 6/1960 Grossman
2,967,595 A 1/1961 Zitomer
2,997,323 A 8/1961 Riser
3,027,188 A 3/1962 Eichstadt
3,122,387 A 2/1964 Wakelin
3,135,542 A 6/1964 Wilkenson
3,187,526 A 6/1965 Moler
3,267,613 A 8/1966 McQuiston
3,288,510 A 11/1966 Gough
3,352,586 A 11/1967 Hakanson
3,362,740 A 1/1968 Burns
3,422,575 A 1/1969 Armstrong
3,425,729 A 2/1969 Bisbing
3,438,153 A 4/1969 Lemme
3,469,877 A 9/1969 Hutchison
3,599,452 A 8/1971 Maruyama
3,600,019 A 8/1971 Toyota
3,642,315 A 2/1972 Alpern
3,645,573 A 2/1972 Strang
3,683,652 A 8/1972 Halopoff
3,706,467 A 12/1972 Martin
3,762,750 A 10/1973 Orr
3,811,718 A 5/1974 Bates
3,907,348 A 9/1975 Bates
3,919,808 A 11/1975 Simmons
3,927,906 A 12/1975 Mieras
3,930,678 A 1/1976 Alexander
4,054,308 A 10/1977 Prohaska
4,059,298 A 11/1977 Van Klompenburg
4,063,766 A 12/1977 Granberg
4,068,406 A * 1/1978 Wood .................. E05D 13/1207
49/446
4,068,871 A 1/1978 Mercer
4,095,827 A 6/1978 Stavenau
4,095,829 A 6/1978 Van Klompenburg
4,102,546 A 7/1978 Costello
4,151,682 A 5/1979 Schmidt
4,165,894 A 8/1979 Wojciechowski
4,223,930 A 9/1980 Costello
4,227,345 A 10/1980 Durham
4,235,465 A 11/1980 Costello
4,253,688 A 3/1981 Hosooka
4,261,602 A 4/1981 Anderson
4,274,666 A 6/1981 Peck
4,293,154 A 10/1981 Cassells
4,303,264 A 12/1981 Uehara
4,305,612 A 12/1981 Hunt
4,392,329 A 7/1983 Suzuki
4,429,910 A 2/1984 Anderson
4,470,277 A 9/1984 Uyeda
4,475,311 A 10/1984 Gibson
4,525,952 A 7/1985 Cunningham
4,580,366 A 4/1986 Hardy
4,587,759 A 5/1986 Gray
4,621,847 A 11/1986 Paulson
4,624,073 A 11/1986 Randall
4,639,021 A 1/1987 Hope
4,643,005 A 2/1987 Logas
4,655,489 A 4/1987 Bisbing
4,683,676 A * 8/1987 Sterner, Jr. .......... E05D 13/1253
49/176
4,718,194 A 1/1988 FitzGibbon
4,736,972 A 4/1988 Mosch
4,801,164 A 1/1989 Mosch
4,813,725 A 3/1989 Mosch
4,824,154 A 4/1989 Simpson
4,826,222 A 5/1989 Davis
4,827,685 A 5/1989 Schmidt
4,893,849 A 1/1990 Schlack
4,922,658 A 5/1990 Coddens
4,923,230 A 5/1990 Simpson
4,949,506 A 8/1990 Durham
4,953,258 A * 9/1990 Mennuto ............. E05D 13/1276
16/193
4,961,286 A 10/1990 Bezubic
4,991,886 A 2/1991 Nolte
5,042,855 A 8/1991 Bennett
5,072,464 A 12/1991 Draheim
5,076,015 A 12/1991 Manzalini
5,087,087 A 2/1992 Vetter
5,087,088 A 2/1992 Milam
5,090,750 A 2/1992 Lindqvist
5,090,754 A 2/1992 Thompson
5,092,640 A 3/1992 Plummer
5,110,165 A 5/1992 Piltingsrud

(56) References Cited

U.S. PATENT DOCUMENTS 5,127,192 A * 7/1992 Cross .................... E05D 13/08 49/181
5,127,685 A 7/1992 Dallaire
5,139,291 A 8/1992 Schultz
5,143,412 A 9/1992 Lindqvist
5,161,839 A 11/1992 Piltingsrud
5,165,737 A 11/1992 Riegelman
5,183,310 A 2/1993 Shaughnessy
5,217,264 A 6/1993 Fier
5,219,193 A 6/1993 Piltingsrud
5,243,783 A * 9/1993 Schmidt .................. E05D 15/22 49/176
5,244,238 A 9/1993 Lindqvist
5,248,174 A 9/1993 Matz
5,274,955 A 1/1994 Dallaire
5,301,467 A * 4/1994 Schmidt .............. E05D 13/1207 49/176
5,341,752 A 8/1994 Hambleton
5,353,548 A 10/1994 Westfall
5,371,971 A * 12/1994 Prete ...................... E05D 15/22 49/181
5,398,447 A 3/1995 Morse
5,437,484 A 8/1995 Yamada
5,448,857 A 9/1995 Stormo
5,452,925 A 9/1995 Huang
5,454,609 A 10/1995 Slocomb
5,536,052 A 7/1996 Maier
5,553,903 A 9/1996 Prete
5,560,149 A 10/1996 Lafevre
5,575,116 A 11/1996 Carlson
5,582,445 A 12/1996 Olsen
RE35,463 E 2/1997 Vetter
5,632,117 A * 5/1997 Prete ...................... E05D 15/22 49/181
5,636,475 A 6/1997 Nidelkoff
5,661,927 A * 9/1997 Polowinczak ...... E05D 13/1276 49/446
5,669,180 A * 9/1997 Maier .................... E05D 15/22 49/176
5,688,000 A 11/1997 Dolman
5,715,631 A 2/1998 Kailian
5,741,032 A 4/1998 Chaput
5,778,602 A 7/1998 Johnson
5,791,700 A 8/1998 Biro
5,806,900 A 9/1998 Bratcher
5,829,196 A 11/1998 Maier
5,839,767 A 11/1998 Piltingsrud
5,901,499 A 5/1999 Delaske
5,901,501 A 5/1999 Fountaine
5,911,763 A 6/1999 Quesada
5,927,768 A 7/1999 Dallmann
5,970,656 A 10/1999 Maier
5,992,907 A 11/1999 Sheldon
6,000,735 A 12/1999 Jourdenais
6,041,475 A * 3/2000 Nidelkoff ................ E05D 15/22 49/181
6,086,121 A 7/2000 Buckland
6,116,665 A 9/2000 Subliskey
6,119,398 A * 9/2000 Yates, Jr. ................ E05D 13/08 49/176
6,135,510 A 10/2000 Diginosa
6,139,071 A 10/2000 Hopper
6,142,541 A 11/2000 Rotondi
6,151,832 A * 11/2000 Opielski ................. E05D 13/08 49/181
6,155,615 A 12/2000 Schulz
6,161,335 A * 12/2000 Beard ..................... E05D 15/22 49/176
6,176,041 B1 1/2001 Roberts
6,178,696 B1 1/2001 Liang
6,183,024 B1 2/2001 Schultz
6,209,931 B1 4/2001 Von Stoutenborough
6,217,087 B1 4/2001 Fuller
6,230,443 B1 5/2001 Schultz
6,250,694 B1 6/2001 Weiland
6,279,266 B1 8/2001 Searcy
6,286,259 B1 * 9/2001 Zeng ....................... E05D 15/22 49/447
6,332,288 B1 * 12/2001 Guillemet ............... E05D 13/08 49/181
6,349,576 B2 2/2002 Subliskey
6,364,375 B1 4/2002 Szapucki
6,378,169 B1 4/2002 Batten
6,450,544 B2 9/2002 Rotondi
6,546,671 B2 4/2003 Mitchell
6,550,184 B1 * 4/2003 O'Donnell .............. E05D 15/22 49/176
6,565,133 B1 5/2003 Timothy
6,568,723 B2 5/2003 Murphy
6,584,644 B2 7/2003 Braid
6,588,150 B1 7/2003 Wong
6,592,155 B1 7/2003 Lemley
6,607,221 B1 8/2003 Elliot
6,631,931 B2 10/2003 Magnusson
6,634,683 B1 10/2003 Brannan
6,688,659 B2 2/2004 Kobrehel
6,802,105 B2 * 10/2004 Polowinczak ...... E05D 13/1276 49/446
6,817,142 B2 11/2004 Marshik
6,848,728 B2 2/2005 Rotondi
6,871,885 B2 3/2005 Goldenberg
6,871,886 B2 3/2005 Coleman
6,877,784 B2 4/2005 Kelley
6,925,758 B2 8/2005 Petit
6,957,513 B2 10/2005 Pettit
6,983,513 B2 1/2006 Pettit
6,983,963 B2 1/2006 Eslick
7,000,957 B2 2/2006 Lawrence
7,013,603 B2 3/2006 Eenigenburg
7,017,957 B2 3/2006 Murphy
7,028,371 B2 * 4/2006 VerSteeg ............. E05D 13/1207 49/181
7,036,851 B2 5/2006 Romig
7,063,361 B1 6/2006 Lawrence
7,070,211 B2 7/2006 Polowinczak
7,070,215 B2 7/2006 Kelley
7,100,951 B2 9/2006 Jien
7,147,255 B2 12/2006 Goldenberg
7,159,908 B2 1/2007 Liang
7,171,784 B2 2/2007 Eenigenburg
7,296,831 B2 11/2007 Generowicz
7,322,619 B2 1/2008 Nolte
7,322,620 B1 1/2008 Lawrence
7,407,199 B2 8/2008 Richardson
7,431,356 B2 10/2008 Liang
7,441,811 B2 10/2008 Lawrence
7,481,470 B2 1/2009 Eenigenburg
7,510,221 B2 3/2009 Eenigenburg
7,530,611 B2 5/2009 Liang
7,559,588 B2 7/2009 Liang
7,607,262 B2 10/2009 Pettit
7,637,544 B2 12/2009 Liang
7,665,775 B1 2/2010 Miller
7,699,365 B2 4/2010 Liang
7,922,223 B2 4/2011 Lawrence
7,976,077 B2 7/2011 Flory
8,074,402 B2 12/2011 Tuller
8,205,919 B2 6/2012 Flory
8,205,920 B2 6/2012 Flory
8,220,846 B2 7/2012 Liang
8,231,148 B2 7/2012 Van Der Kooij
8,235,430 B2 8/2012 Liang
8,272,164 B2 9/2012 Albrecht
8,336,930 B2 12/2012 Liang
8,360,484 B2 1/2013 Liang
8,414,039 B2 4/2013 Liang
8,511,724 B2 8/2013 Liang
8,550,507 B2 10/2013 Barton
8,561,260 B2 * 10/2013 Baker .................. E06B 3/4415 16/401
8,567,830 B2 10/2013 Liang
8,640,383 B1 * 2/2014 Kunz .................. E05D 13/1276 49/446

(56) References Cited

U.S. PATENT DOCUMENTS

| | | | | |
|---|---|---|---|---|
| 8,657,347 | B2 | 2/2014 | Liang | |
| 8,726,572 | B2 | 5/2014 | Derham | |
| 8,789,857 | B2 | 7/2014 | Liang | |
| 8,789,862 | B2 | 7/2014 | Liang | |
| 8,833,809 | B2 | 9/2014 | Liang | |
| 8,844,985 | B2 | 9/2014 | Liang | |
| 8,850,745 | B2 * | 10/2014 | Sofianek | E05D 13/1276 49/447 |
| 8,870,244 | B2 | 10/2014 | Liang | |
| 8,881,461 | B2 | 11/2014 | Derham | |
| 9,103,144 | B2 | 8/2015 | Liang | |
| 9,133,656 | B2 | 9/2015 | Steen | |
| 9,140,033 | B2 | 9/2015 | Wolf | |
| 9,309,709 | B2 * | 4/2016 | DeNormand | E05D 13/1276 |
| 9,371,677 | B1 * | 6/2016 | Kunz | E05D 15/22 |
| 9,376,834 | B2 | 6/2016 | Liang | |
| 9,493,970 | B2 | 11/2016 | Campbell | |
| 9,816,300 | B2 | 11/2017 | Derham | |
| 10,053,899 | B2 | 8/2018 | deNormand | |
| 10,081,972 | B1 | 9/2018 | Kunz | |
| 10,107,021 | B1 | 10/2018 | Liang | |
| 10,415,287 | B1 * | 9/2019 | Kunz | E06B 3/5063 |
| 10,563,440 | B2 * | 2/2020 | Kellum | F16F 1/12 |
| 10,563,441 | B2 | 2/2020 | Kellum | |
| 11,072,957 | B2 * | 7/2021 | Newman | E05D 15/22 |
| 11,352,821 | B2 * | 6/2022 | Kellum | E05D 15/22 |
| 2006/0192391 | A1 | 8/2006 | Pettit | |
| 2006/0244270 | A1 | 11/2006 | Rotondi | |
| 2007/0205615 | A1 | 9/2007 | Eenigenburg | |
| 2008/0012358 | A1 | 1/2008 | Liang | |
| 2008/0022728 | A1 | 1/2008 | Flory | |
| 2008/0169658 | A1 | 7/2008 | Wolf | |
| 2008/0178424 | A1 | 7/2008 | Tuller | |
| 2009/0260295 | A1 | 10/2009 | Tuller | |
| 2010/0199726 | A1 | 8/2010 | Varney | |
| 2010/0218425 | A1 | 9/2010 | Nolte | |
| 2010/0263415 | A1 | 10/2010 | Ruspil | |
| 2012/0126548 | A1 * | 5/2012 | Zhuo | E05D 15/0604 292/169 |
| 2013/0214545 | A1 | 8/2013 | Wolf | |
| 2013/0283695 | A1 | 10/2013 | Hollerman | |
| 2014/0000172 | A1 | 1/2014 | Sofianek | |
| 2016/0076282 | A1 | 3/2016 | Wolf | |
| 2023/0073314 | A1 | 3/2023 | Denormand | |

FOREIGN PATENT DOCUMENTS

| | | |
|---|---|---|
| GB | 2 461 107 | 12/2009 |
| GB | 2 461 108 | 12/2009 |
| JP | 2003041812 A | 2/2003 |

OTHER PUBLICATIONS

"Three General Types of Fit," available at www.mmto.org/dclark/Reports/Encoder%20Upgrade/fittolerences%20%5BRead-Only%5D.pdf., Jul. 8, 2019.

"Engineering Fit," available at: https://en.wikipedia.org/wiki/Engineering_fit, Jul. 8, 2019.

* cited by examiner

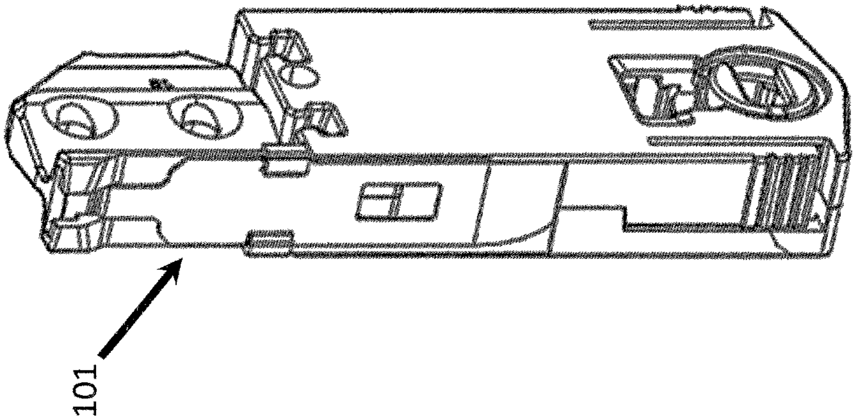
FIG. 36
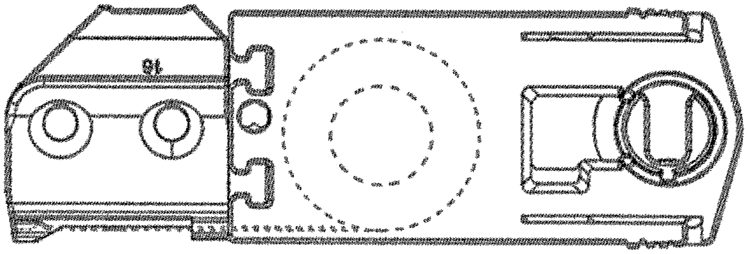
FIG. 37
FIG. 40
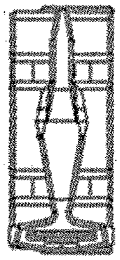
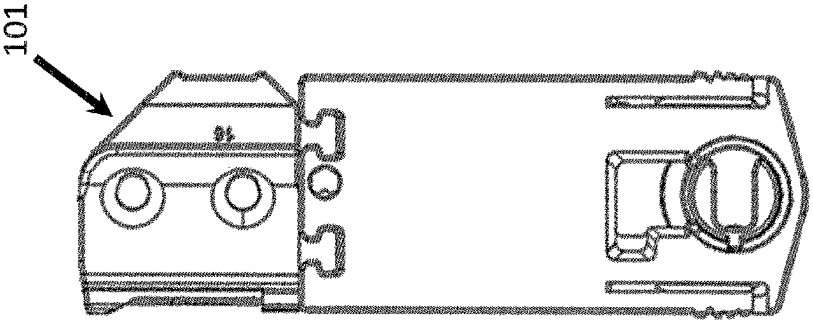
FIG. 38
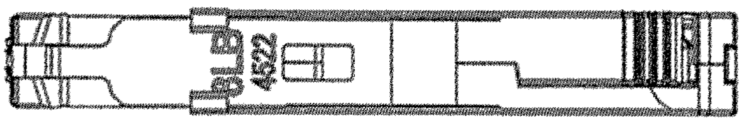
FIG. 39

WINDOW BALANCE ASSEMBLY WITH IMPROVED MOUNTING BRACKET AND CURL SPRING ATTACHMENT

CROSS-REFERENCES

This application claims priority on U.S. Provisional Patent Application Ser. No. 63/514,159, filed on Jul. 18, 2023, having the title "Window Balance Shoe," the disclosures of which are incorporated herein by reference.

FIELD OF THE INVENTION

The present invention relates to an improved window balance system for a sliding sash window, and more particularly relates to an improved mounting bracket and curl spring attachment arrangement for the window balance system.

BACKGROUND OF THE INVENTION

Single hung and double hung sash windows are commonly used today in the construction of residential and commercial buildings. Sash locks are typically mounted to the meeting rail of the bottom sash window to lock the sash or sashes, by preventing the lower sash (or both the lower and upper sashes for a double hung window), from being opened through sliding movement relative to the master window frame.

To assist in the cleaning of the exterior of the glazing of the sash window, it may be constructed differently. Rather than the frame of the sash window itself being slidable within a track of the master window frame, a lower pivotal member on the sash window may slide in the track, and a pair of tilt latch devices mounted on an upper part of the window frame may also slide in the track of the master window frame. The tilt latches may be actuated to be withdrawn from the track to permit tilting of the sash window about the lower pivotal member into the room.

A window balance assembly has traditionally been used to apply a lifting force to counterbalance the weight of a window sash, so that it is easier to lift open by a user, and so that it does not slam shut in the downward direction once released by the user. Many different arrangements have been developed for a window balance assembly over the course of decades. To counterbalance the constant force of the weight of the window, curl springs were eventually utilized. A curl spring may generally apply a constant force to counterbalance the window's weight, as it may be formed of a length (i.e., a narrow strip) of spring steel (or other suitable material) that has been formed to normally curl up into a spiral shape having multiple convolutions, when no force is applied to it.

When a force is exerted to the outer end of the strip and the convolutions are uncurled and extended, each linear increment of the extended strip is biased to recurl itself and may thus exert a constant force against further extension of the spring.

However, these arrangements tend to be deficient with respect to the ease of the attachment of the tail of the curl spring to the mounting bracket. More importantly, the attachment of the tail of the curl spring to the mounting bracket of these arrangements tends to permit excessive movement of the curl spring at its end, which may raise frictional resistance through contact with the channel/track in which it is installed.

Balance Assemblies that may be related, and which are not admitted to be prior art to the herein disclosed invention, may be shown within the following U.S. Pat. No. 2,732,594 to Adams; U.S. Pat. No. 2,739,344 to Dickinson; U.S. Pat. No. 4,683,676 to Sterner; U.S. Pat. No. 4,718,194 to FitzGibbon; U.S. Pat. No. 5,353,548 to Westfall; U.S. Pat. No. 5,661,927 to Polowinczak; U.S. Pat. No. 6,378,169 to Batten; U.S. Pat. No. 6,584,644 to Braid; U.S. Pat. No. 6,802,105 to Polowinczak; U.S. Pat. No. 6,983,513 to Pettit; U.S. Pat. No. 8,074,402 to Tuller; U.S. Pat. No. 8,561,260 to Baker; U.S. Pat. No. 9,133,656 to Steen; U.S. Pat. No. 10,053,899 to deNormand; and U.S. Pat. No. 11,352,821 to Kellum.

It is noted that the citing of any reference within this disclosure, i.e., any patents, published patent applications, and non-patent literature, is not an admission regarding a determination as to its availability as prior art with respect to the herein disclosed and claimed method/apparatus.

The herein disclosed apparatus provides improvements upon each balance assembly in the prior art.

OBJECTS OF THE INVENTION

It is an object of the invention to provide an improved balance assembly to counterbalance the weight of a sash window.

It is another object of the invention to provide an improved attachment arrangement for the tail of a curl spring to the mounting bracket of a sash window balance assembly.

It is a further object of the invention to provide an improved attachment arrangement that more easily facilitates securement of the tail of a curl spring with respect to the mounting bracket of a sash window balance assembly.

It is a further object of the invention to provide an improved attachment arrangement with respect to the tail of the curl spring and the mounting bracket of a sash window balance assembly that better restricts movement of the curl spring at its end, to thereby reduce frictional resistance through contact with the channel in which it is installed.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A window balance assembly disclosed herein includes a housing, a receiver, a curl spring, and a mounting bracket. The housing may be formed as a single unitary piece, or may alternatively be formed in two pieces. The housing may have protrusions that define a first interior space and a second interior space. The receiver may be rotatably supported in the first interior space of the housing and may be formed to include a cam surface. A first portion of the curl spring—consisting of the series of curled-up convolutions—may be disposed within the second interior space of the housing, which space may be generally cylindrical. A second portion of the curl spring is formed to be generally straight and thus does not curl as do the convolutions maintained in the second interior space; therefore, the second portion may extend out of the second interior space and out of the housing, where it may be secured to the mounting bracket. A distal end of the second portion of the curl spring includes a neck portion, and an elongated head portion. The elongated head portion is oriented transverse to the neck portion at a distal end of the neck portion.

The mounting bracket is formed to include a first flange and a second flange. The second flange may include one or more orifices that may be used to secure the bracket to the sash window. The first flange is particularly formed to provide for improved attachment characteristics with respect to the tail of the curl spring.

The first flange is formed to include a first guide member and a second guide member, each of which respectively protrude from first and second sides of a rear surface of the first flange, being positioned distally from the top of the mounting bracket. The first guide member and the second guide member are preferably formed to have a right angle cross-sectional shape, which right angles face each other and are spaced apart a particular distance, so that in combination, the two guide members may slidably receive and guide the coordinated width of the curl spring, and also maintain the second portion of the curl spring in close proximity to, or in contact with, the rear surface, when the curl spring slides due to movement of the sash window. The first flange is also formed to include a first ramp member and a second ramp member, each of which respectively protrude from the first and second sides of the rear surface of the first flange, being positioned near or at the top of the mounting bracket. Each of the first ramp member and second ramp member have a top surface that is formed to include a recess. The first ramp member and the second ramp member are spaced apart on the rear surface to form a gap that is particularly configured to permit sliding passage of the coordinated width of the neck of the curl spring between the two ramp members, when the neck is positioned in close proximity to the rear surface of the first flange. The ramp surfaces of the first ramp member and the second ramp member are each configured to divert (i.e., to deflect) opposing sides of the head away from the rear surface, when the second portion of said curl spring is manually advanced upwardly (i.e., is caused to slide) between the first guide member and the second guide member. The head (as well as the unrestrained second portion of the curl spring being above the two guide members) is so deflected until the head passes above and beyond the two ramp members, at which time the generally straight second portion of the curl spring will naturally return to being in proximity to (or in contact with) the rear surface of the first flange, with the neck then being positioned in the gap between the two ramp members. Once the manual force being applied to the second portion of the curl spring is removed, the curl spring will bias the spring to retract into the second interior space of the housing, until opposite sides of the head are respectively received into the recesses formed in the top surface of the two ramp members, with the neck being nested in the gap between the ramp members, and thereby temporarily maintaining the curl spring in a static position, which position may be subsequently altered after installation of the balance assembly and opening of the sliding sash window.

The first guide member and the second guide member, as well as the first ramp member and the second ramp member, may each be symmetrically formed on the rear surface of the first flange of the mounting bracket.

The housing may also be formed to include a first elongated tab and a second elongated tab, being positioned on opposite sides of the housing. The cam of the receiver is configured to cause the distal ends of the first elongated tab and second elongated tab to deflect outwardly, when the receiver is rotated from a first position to a second position as a result of the sash window being tilted.

BRIEF DESCRIPTION OF DRAWINGS

The description of the various example embodiments is explained in conjunction with the following appended drawings.

FIG. 36 is the perspective view of the balance assembly of FIG. 1 shown enlarged.

FIG. 37 is a transparent side view of the balance assembly of FIG. 36.

FIG. 38 is a side view of the balance assembly of FIG. 36.

FIG. 39 is an end view of the balance assembly of FIG. 36.

FIG. 40 is a top view of the balance assembly of FIG. 36.

DETAILED DESCRIPTION OF THE INVENTION

Figure 1:
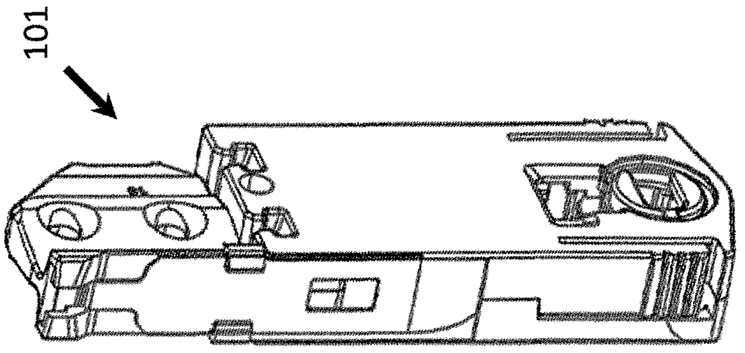
FIG. 1 is a perspective view of a first embodiment of a window balance assembly disclosed herein.

As used throughout this specification, the word "may" is used in a permissive sense (i.e., meaning having the potential to, or being optional), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, It is noted that the citing of any reference within this disclosure, i.e., any patents, published patent applications, and non-patent literature, is not an admission regarding a determination as to its availability as prior art with respect to the herein disclosed and claimed apparatus/method.

Furthermore, any reference made throughout this specification to "one embodiment" or "an embodiment" means that a particular feature, structure or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with design variations described in the specification, as well as applicable case law. Also, in at least some instances, a numerical difference provided by the approximating language may correspond to the precision of an instrument that may be used for measuring the value. A numerical difference provided by the approximating language may also correspond to a manufacturing tolerance associated with production of the aspect/feature being quantified (see e.g., *Ex Parte Ollmar*, Appeal No. 2014-006128 (PTAB 2016)). Furthermore, a numerical difference provided by the approximating language may also correspond to an overall tolerance for the aspect/feature that may be derived from variations resulting from a stack up (i.e., the sum) of a multiplicity of such individual tolerances.

Any use of a friction fit (i.e., an interface fit) between two mating parts described herein indicates that the opening (e.g., a hole) is smaller than the part received therein (e.g., a shaft), which may be a slight interference in one embodiment in the range of 0.0001 inches to 0.0003 inches, or an interference of 0.0003 inches to 0.0007 inches in another embodiment, or an interference of 0.0007 inches to 0.0010 inches in yet another embodiment, or a combination of such ranges. Other values for the interference may also be used in different configurations (see e.g., "Press Fit Engineering and Design Calculator," available at: www.engineersedge.com/calculators/machine-design/press-fit/press-fit-calculator.htm).

Any described use of a clearance fit indicates that the opening (e.g., a hole/recess) is larger than the part received therein (e.g., a shaft/protrusion), enabling the two parts to move (e.g. to slide and/or rotate) when assembled, where the gap between the opening and the part may depend upon the size of the part and the type of clearance fit—i.e., loose running, free running, easy running, close running, and sliding (e.g., for a 0.1250 inch shaft diameter the opening may be 0.1285 inches for a close running fit, and may be 0.1360 inches for a free running fit; for a 0.5000 inch diameter shaft the opening may be 0.5156 inches for a close running fit and may be 0.5312 inches for a free running fit). Other clearance amounts are used for other clearance types. See "Engineering Fit" at: en.wikipedia.org/wiki/Engineering_fit; and "Three General Types of Fit," available at mmto.org.

Figure 2:
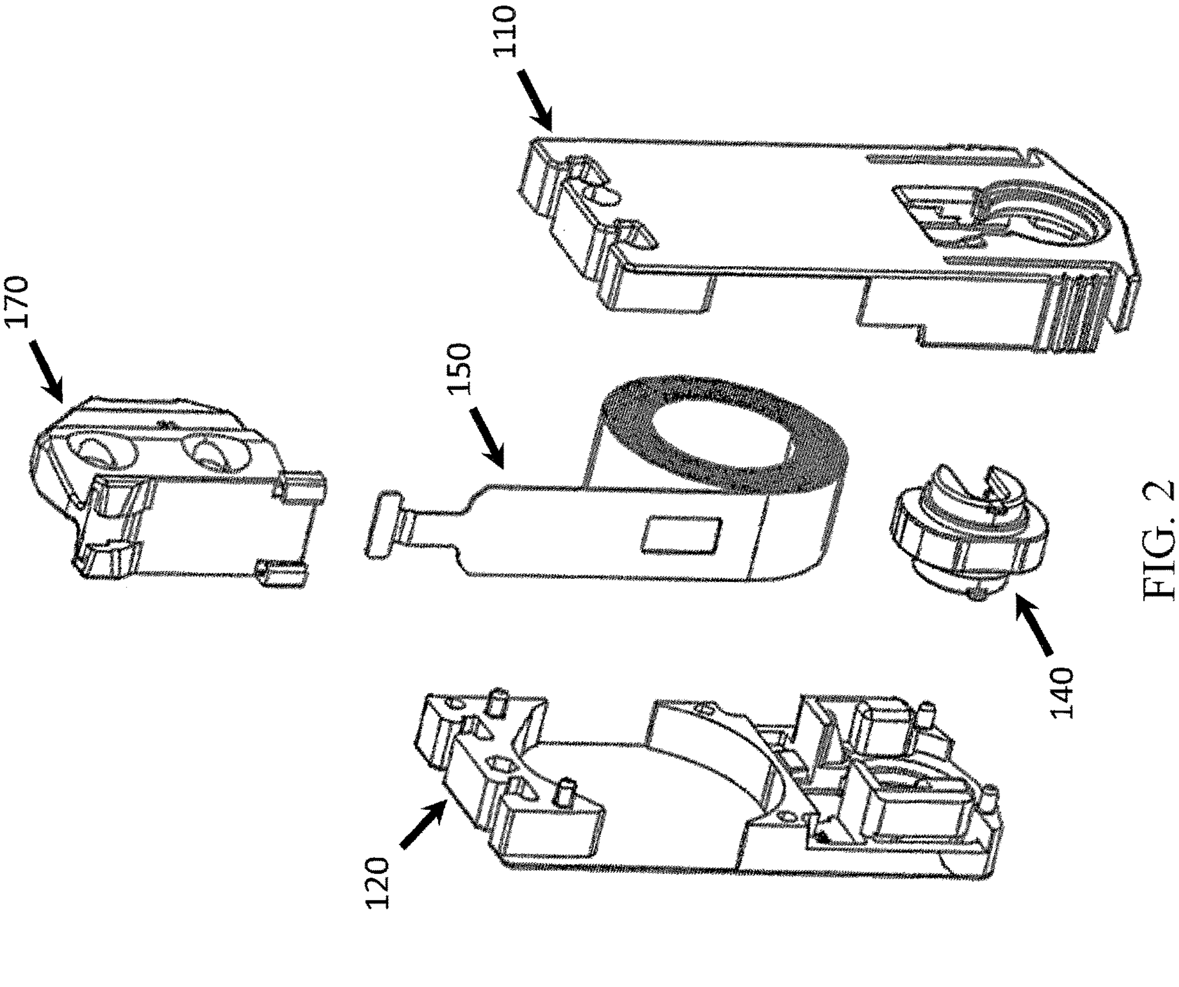
FIG. 2 is an exploded view showing the component parts of the window balance assembly of FIG. 1.

FIG. 1 shows a perspective view of a window balance assembly 101. FIG. 2 shows an exploded view of the component parts used to form the window balance assembly 101 of FIG. 1, which may include a curl spring 150, a receiver 140, a mounting bracket 170, and a housing. The housing may be formed as a single unitary part, into which the components may be installed, or alternatively, as seen in FIG. 2, it may be more advantageous from a manufacturing standpoint and an assembly standpoint for the housing to be formed into two separate parts that may be joined together, i.e., a first housing portion 110 and a second housing portion 120.

These component parts are first individually described within the following paragraphs, after which a description of the assembly of those parts and the operation of the window balance assembly is then provided.

As seen in FIGS. 3-9, the mounting bracket 170 is formed to include a first flange 171 and a second flange 172. The mounting bracket 170 may be formed of any suitable material including, but not limited to, a metallic material, a plastic material, a wood material, a composite material (e.g., fiberglass, carbon fiber . . . ), etc. The first flange 171 and the second flange 172 may be formed at a ninety-degree angle to each other. Also, each of the first flange 171 and the second flange 172 may be formed to have a rectangular cross-sectional shape, or may alternatively be formed to have draft angles, such as when formed by an extruding process or a casting process. Additionally, or alternatively, one or both of the flanges 171/172 may have sculpted surfaces that may be tailored to provide required strength and stiffness only where needed (e.g., varying thinner and thicker flanges), and may also be thicker as needed to support particular features (e.g., the apertures).

Figures 3, 4, 5, 6, 7, 8, 9:
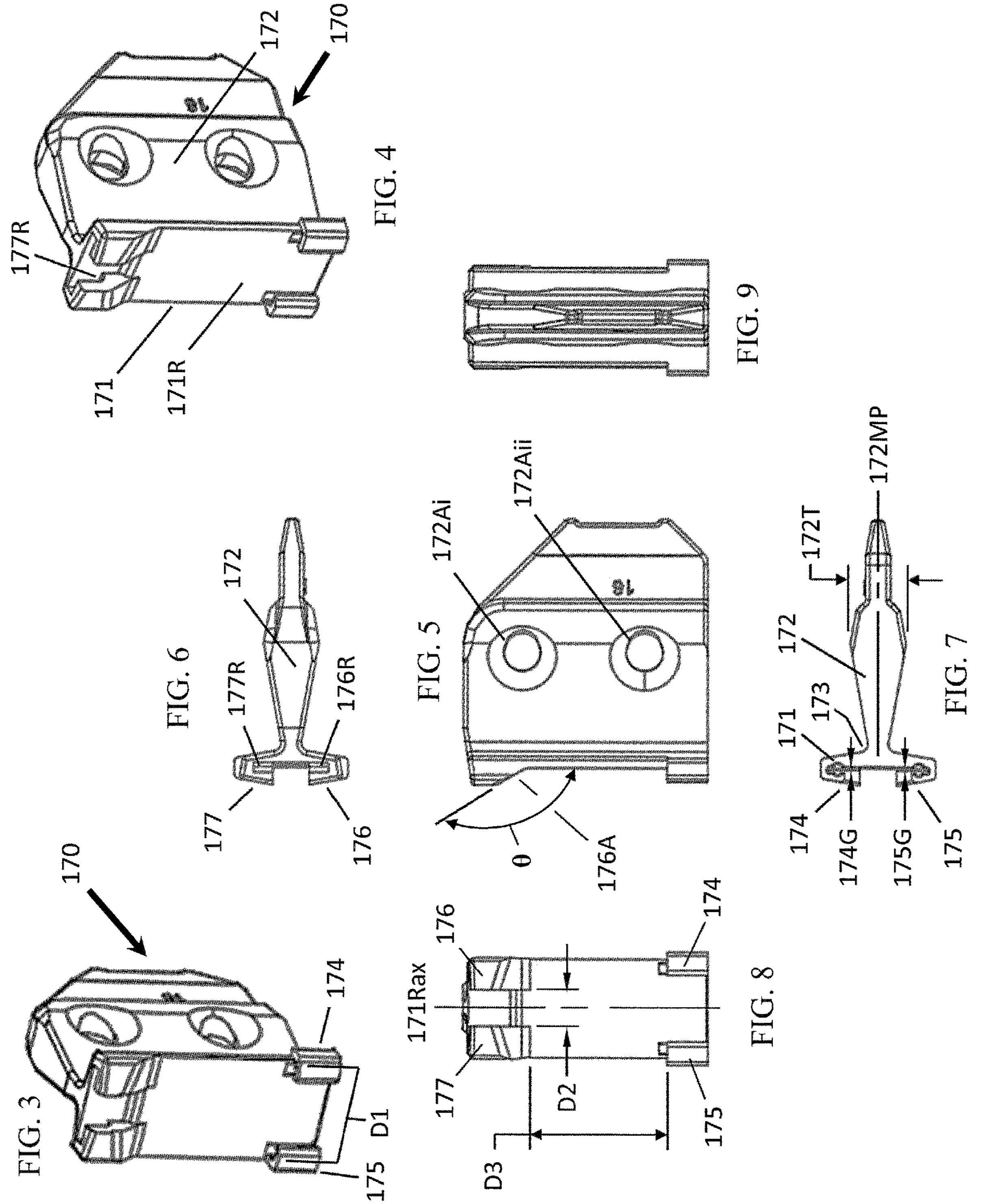
FIG. 3 is a first perspective view of the mounting bracket of the window balance assembly of FIG. 1.
FIG. 4 is a second perspective view of the mounting bracket of the window balance assembly of FIG. 1.
FIG. 5 is a side view of the mounting bracket of the window balance assembly of FIG. 1.
FIG. 6 is a top view of the mounting bracket of the window balance assembly of FIG. 1.
FIG. 7 is a bottom view of the mounting bracket of the window balance assembly of FIG. 1
FIG. 8 is a rear view of the mounting bracket of the window balance assembly of FIG. 1
FIG. 9 is a front view of the mounting bracket of the window balance assembly of FIG. 1

For example, as seen in FIG. 7, the second flange 172 may have a smaller thickness at its base 173, i.e., in proximity to the first flange 171, and its thickness may taper (increase) to a maximum thickness 172T proximate to its middle section. A pair of apertures 172Ai and 172Aii may be formed in the second flange 172, and the axis of each of the apertures 172Ai and 172Aii may be formed at a non-ninety-degree angle to the mid-plane 172MP of the second flange 172.

The first flange 171 may be formed with features that may accommodate a unique and improved coupling of the curl spring 150 to the mounting bracket 170.

The first flange 171 may be formed with a first guide member 174 that may protrude from a first side of a rear surface 171R of the first flange, which rear surface is positioned opposite to the surface at which the second flange 172 protrudes. The first flange 171 may also be formed with a second guide member 175 that may protrude from a second side of the rear surface 171R of the first flange 171. Each of the first guide member 174 and the second guide member 175 may be generally L-shaped, each having short outstanding legs that protrude perpendicularly away from the rear surface 171R, and which outstanding legs of the two L-shapes may be spaced apart a distance D1 (FIG. 3) that may be just slightly larger than the width W1 of the curl spring (see FIG. 12), creating a slight clearance for the curl spring to slide/fit therebetween. A second set of legs respectively extend laterally from those outstanding legs to form the L-shape of the first and second guide members 174 and 175. The laterally extending legs of the L-shape may be parallel to, and spaced apart from, the rear surface 171R, forming respective gap dimensions 174G and 175G, which gaps may be the same. (Note that where the mounting bracket is formed as a casting or an extrusion, the interior surfaces of the L-shape may nonetheless be perpendicular to and parallel to the rear surface 171R while the exterior surface may have draft). The gap dimension 174G and the gap dimension 175G (FIG. 7) may be formed to be slightly smaller than the thickness 150T of the curl spring (FIG. 11), creating a slight friction fit that would always keep the curl spring 150 in positive contact with the rear surface 171R of the first flange 171. Alternatively, the gap dimension 174G and the gap dimension 175G may be formed to be slightly larger than the thickness of the curl spring, creating a clearance fit that would keep the curl spring 150 in proximity to, but not necessarily contacting, the rear surface 171R of the first flange 171. The degree of proximity may correlate to the amount/type of a clearance fit that is used, which may be a loose running fit, a free running fit, a close running fit, or a sliding fit, the dimensions and tolerances of which are known in the art of designing such fits for sliding parts.

The first flange 171 may also be formed with a first ramp member 176 that may protrude from the first side of the rear surface 171R of the first flange, and a second ramp member 177 that may protrude from the second side of the rear surface 171R. Each of the first ramp member 176 and the second ramp member 177 may include an angled surface (e.g., surface 176A) that is configured to be at an obtuse angle θ with respect to the rear surface, as seen in FIG. 5. The angle θ may be in the range of about 135 degrees to 145 degrees in one embodiment, or may be in the range of about 145 degrees to 155 degrees in yet another embodiment, or may be in the range of about 155 degrees to 160 degrees in another embodiment, or may be in the range of about 160 degrees to 170 degrees in yet a different embodiment, or a combination of such ranges or other ranges may alternatively be used.

Figure 12:
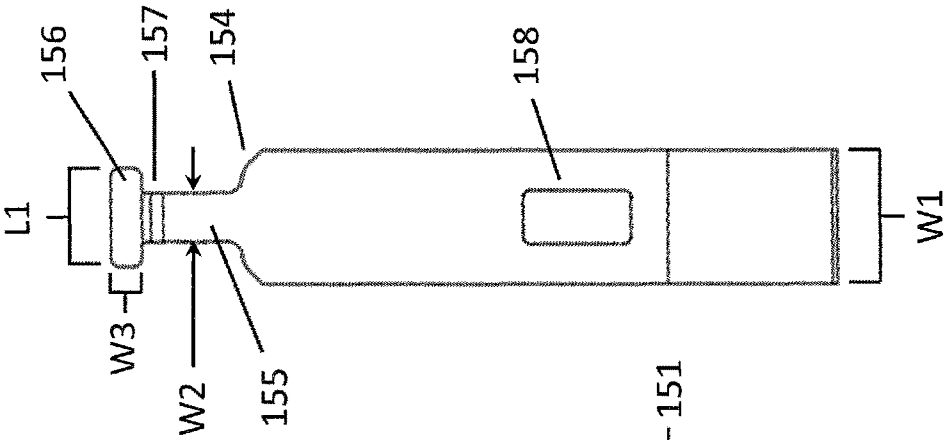
FIG. 12 is a rear view of the curl spring of the window balance assembly of FIG. 1.

The first ramp member 176 and the second ramp member 177 are spaced apart a distance D2 to form a gap configured to permit passage of the neck portion 155 of the curl spring 150 in the gap, i.e., the gap distance D2 (FIG. 8) is slightly larger than the width W2 of the neck portion 155 of the curl spring 150 (FIG. 12). A recess 176R may be formed in the top of the first ramp member 176, and a recess 177R may be formed in the top of the second ramp member 177. As may be seen in FIG. 8, the first ramp member 176 and the second ramp member 177 may be positioned at one end (i.e., the "upper" end) of the rear surface 171R, and the first guide member 174 and second guide member 175 may be positioned at the opposite end (i.e., the "lower" end) of the rear surface 171R. As seen in FIG. 8, the first and second ramp members 176 and 177, and the first and second guide members 174 and 175 may be positioned at the four quadrants of the rear surface 171R, i.e., the upper left and right quadrants, and the lower left and right quadrants. It is noted that other sizes for the rear surface may alternatively be used, so that the ramp members and the guide members may not be positioned at the extreme outermost quadrants of the rear surface. However, the first and second ramp members

176 and 177, which may be positioned at the same distance along the axis 171Rax of the rear surface 171 (i.e., at the same height as seen in FIG. 8), are also preferably positioned a distance D3 away from the first guide member 174 and second guide member 175.

Figure 10:
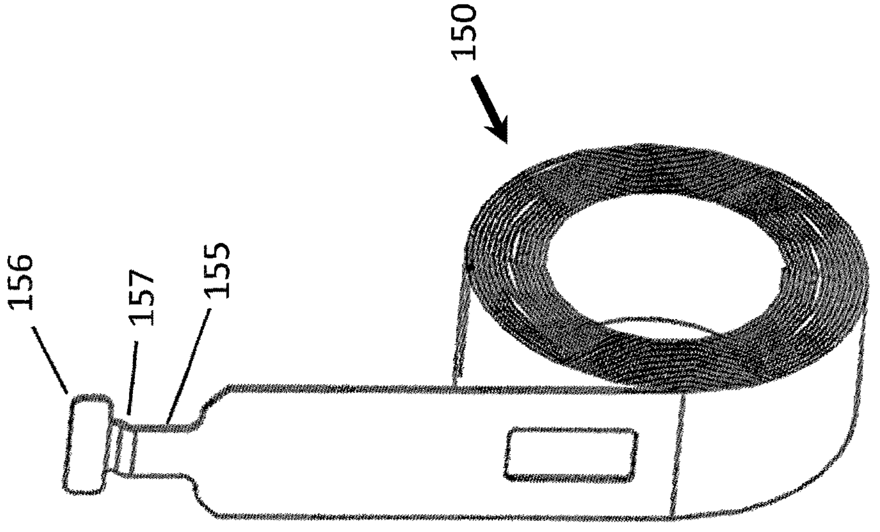
FIG. 10 is a perspective view of the curl spring of the window balance assembly of FIG. 1.
Figure 11:
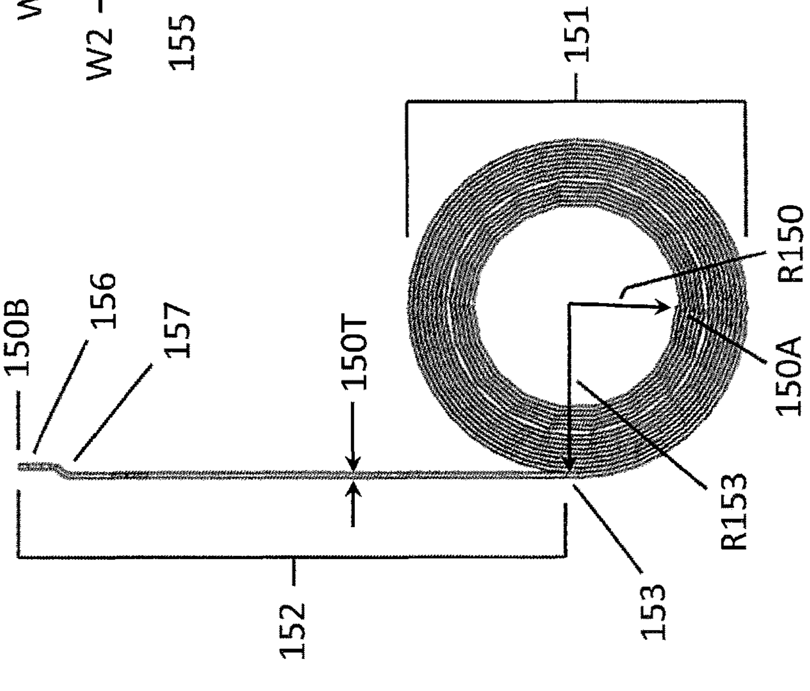
FIG. 11 is a side view of the curl spring of the window balance assembly of FIG. 1.
Figure 13:
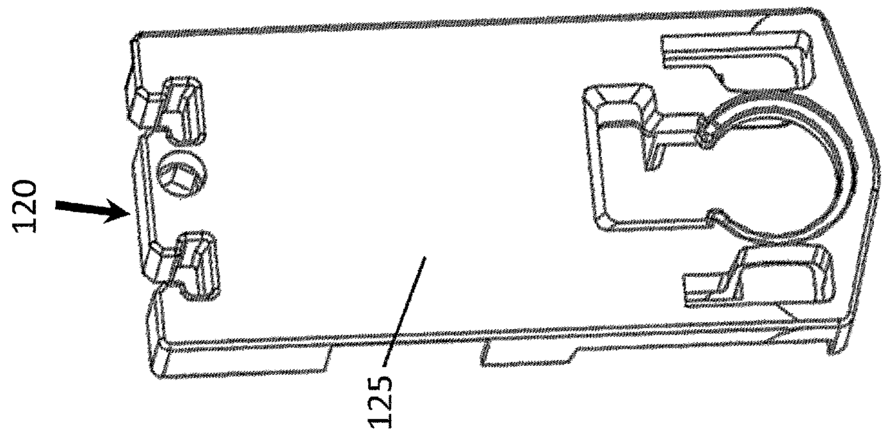
FIG. 13 is a first perspective view of a first housing portion of the window balance assembly of FIG. 1.
Figure 14:
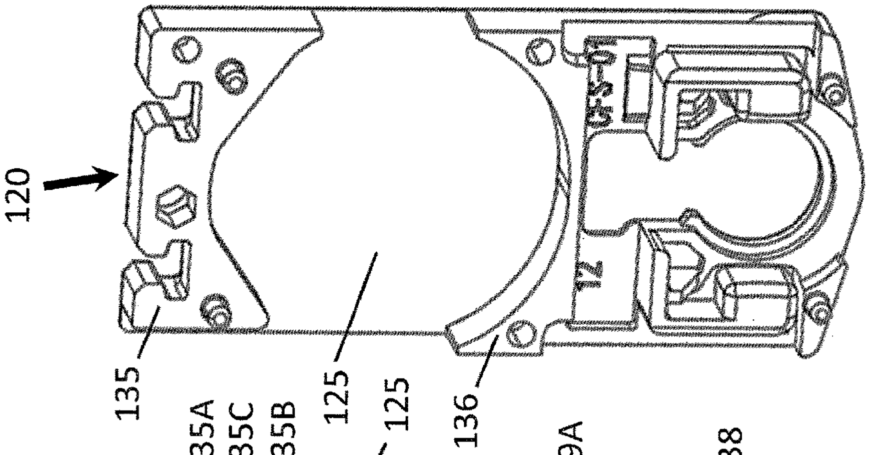
FIG. 14 is a second perspective view of the first housing portion of the window balance assembly of FIG. 1.
Figure 15:
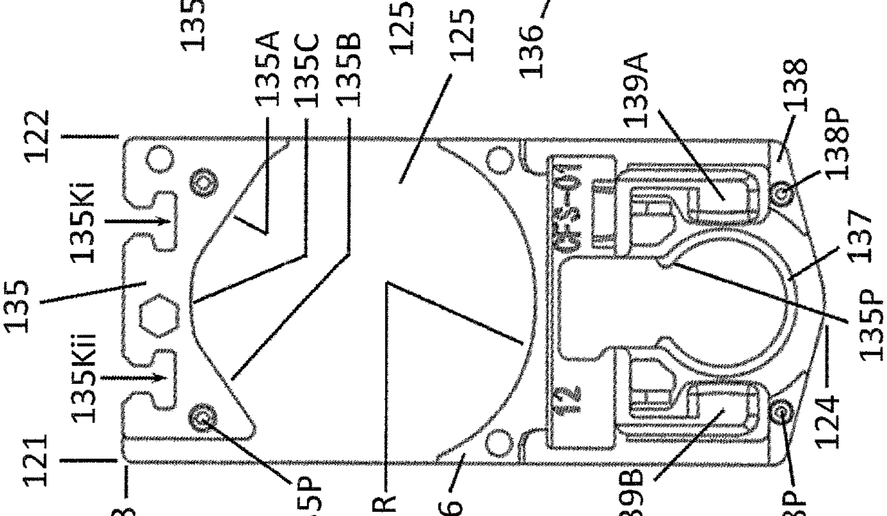
FIG. 15 is a side view of a first housing portion of the window balance assembly of FIG. 1.
Figure 16:
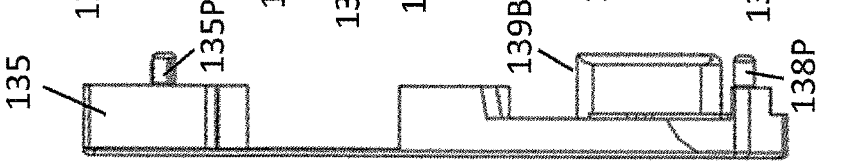
FIG. 16 is an end view of the first housing portion of the window balance assembly of FIG. 1.
Figure 17:
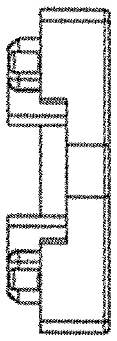
FIG. 17 is a top view of the first housing portion of the window balance assembly of FIG. 1.
Figure 18:
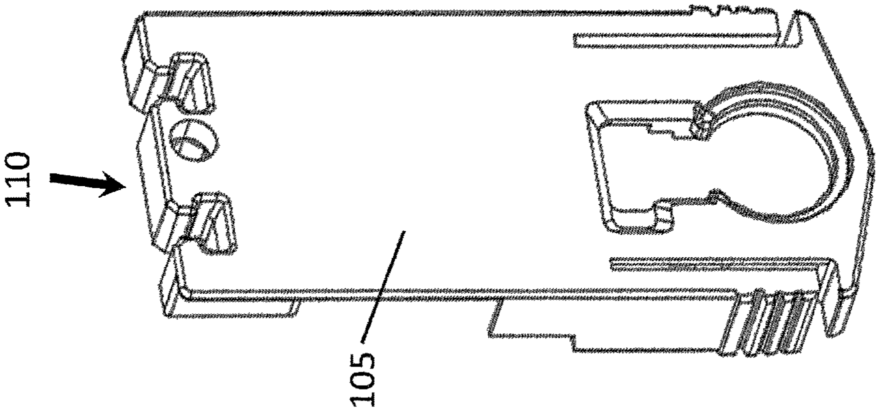
FIG. 18 is a first perspective view of a second housing portion of the window balance assembly of FIG. 1.
Figure 19:
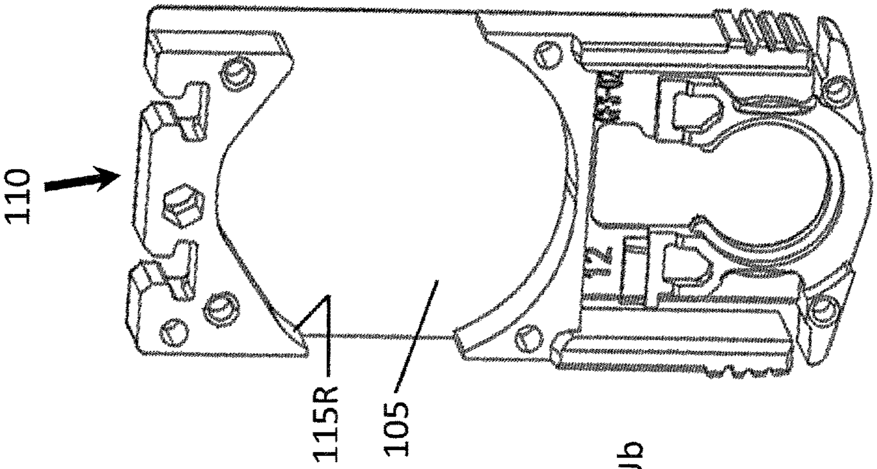
FIG. 19 is a second perspective view of the second housing portion of the window balance assembly of FIG. 1.

As seen in FIGS. 10-12, the curl spring 150 has a first end 150A and a second end 150B, and is formed into a first portion 151 and a second portion 152. The curl spring 150 is formed of a length of a narrow strip of a suitable resilient material (e.g., spring steel), having a width W1 that is much smaller than the length used for the strip. The first portion 151 of the curl spring 150, which begins at the first end 150A, is formed to normally curl up into a spiral shape having into a plurality of convolutions, when no force is applied to it, with the first end 150A being disposed within, and positioned at the start of, the plurality of convolutions. The plurality of convolutions may have a radius of curvature R150 at the end 150A, which radius, in one embodiment, may be on the order of about 9-10 mm (3/8th of an inch), but may vary according to the requirements of a particular sash window. In one embodiment, there may be about 12-14 convolutions; however, the number of convolutions may be coordinated with the radius of curvature used, the width W1 and thickness 150T of the strip of material, as well as the overall size of the housing 110/120, and each may be selected and coordinated as needed to accommodate balancing of a window having a particular size and weight. The second portion 152 of the curl spring 150 may be formed to be substantially straight, and may extend from the last convolution at a tangency point 153, where the end of the last convolution may have a radius of curvature of R153 at that tangent point. The curl spring 150, proximate to the second end 150B, may be formed to transition at 154 into a neck portion 155, which may have a width W2 that may be centrally positioned with respect to the overall width W1 of the strip of material used to form the curl spring. The neck portion 155 may transition into an elongated head portion 156, with the elongated head portion being oriented transverse (i.e., at ninety degrees) to the neck portion, having a length L1 and a width W3. The length L1 of the head portion 156 may be centrally positioned with respect to the overall width W1 of the strip of material used to form the curl spring. The neck portion 155 may transition into the head portion 156 via a sheet metal joggle 157. The second portion 152 of the curl spring 150 may also be formed to include an opening 158 that may be generally rectangular, and which may be centrally positioned with respect to the overall width W1 of the strip of material used to form the curl spring.

Figure 24:
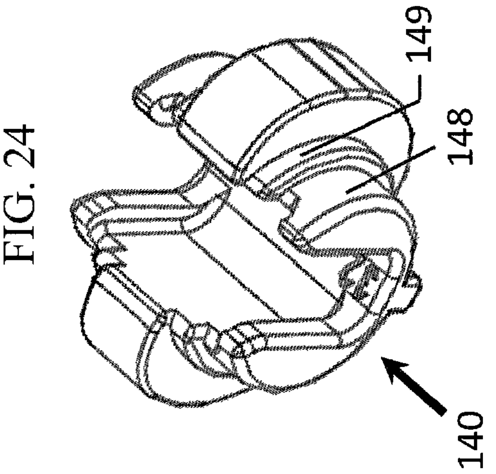
FIG. 24 is a second perspective view of the receiver of the window balance assembly of FIG. 1.
Figure 27:
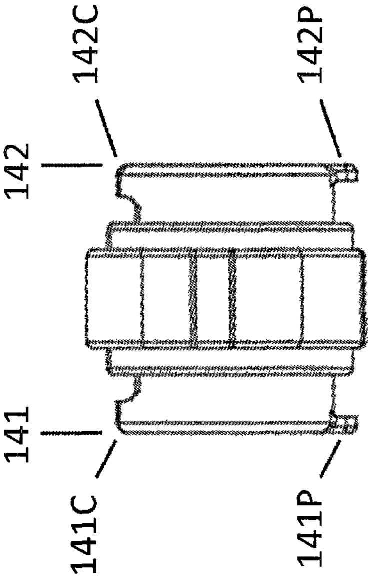
FIG. 27 is an end view of the receiver of the window balance assembly of FIG. 1.
Figure 25:
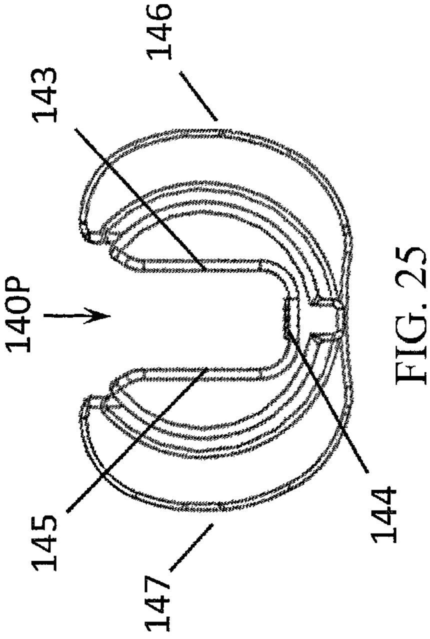
FIG. 25 is a side view of the receiver of the window balance assembly of FIG. 1.
Figure 26:
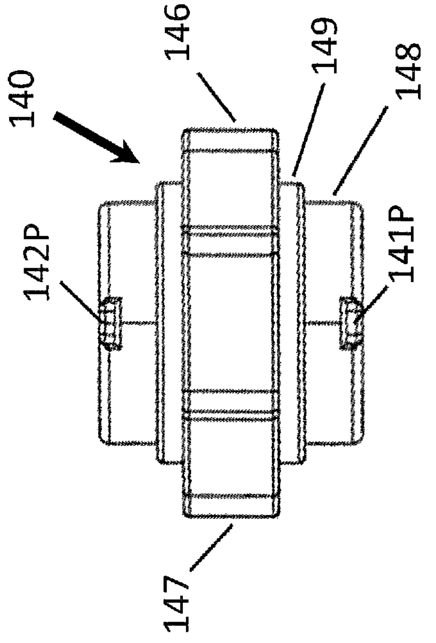
FIG. 26 is a top view of the receiver of the window balance assembly of FIG. 1.

As seen in FIGS. 23-27, the receiver 140 may be formed to have a cylindrical shape defined by a cylindrical surface 148 that may extend from a first end 141 to a second end 142. The ends of the cylindrical surface 148 may each be respectively rounded or chamfered at 141C and 142C. A respective protrusion 141P and 142P may also extend proximate to a portion of each of the first end 141 and second end 142, to help secure the receiver to the housing portions. As seen in FIG. 24 and FIG. 26, a cylindrical hub 149 may be concentrically and centrally positioned with respect to the cylindrical surface 148, and may be formed to have a slightly larger diameter. A generally rectangular shaped opening 140P may be formed in the cylindrical shape of cylindrical surface 148 to create a three-sided keyway (i.e., sides 143, 144, and 145) into which a portion of the window (a "key") may be received in order to actuate/rotate the receiver 140 when the window is rotated inwardly. Protruding outwardly from the cylindrical surface 148 on a first side of the keyway (i.e., opposite the long side 143) may be a first cam 146, and protruding outwardly from the cylindrical surface 148 on a second side of the keyway (i.e., opposite the long side 145) may be a second cam 147. The shape of the second cam 147 may be a mirrored version of the first cam 146 (i.e., as seen in FIG. 25, the cam may be symmetrical about its centerline).

As seen in FIGS. 13-22, the housing may be formed into two parts, which two parts may be exactly the same (i.e., being two halves), or which may alternatively be two unique parts, e.g., housing portion 110, and housing portion 120.

Figure 20:
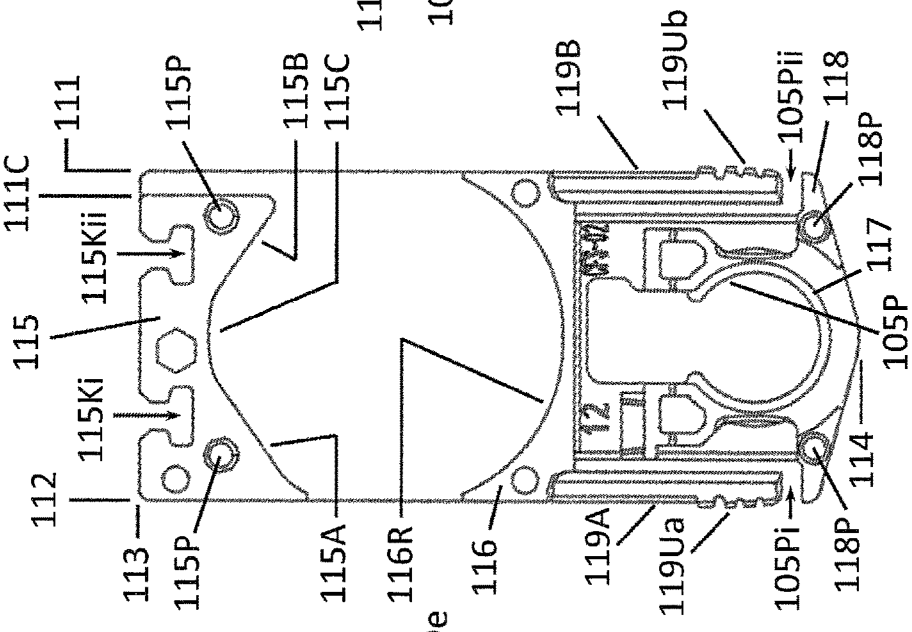
FIG. 20 is a side view of a second housing portion of the window balance assembly of FIG. 1.
Figure 21:
FIG. 21 is an end view of the second housing portion of the window balance assembly of FIG. 1.
Figure 22:
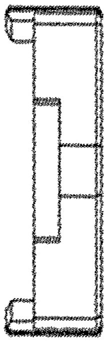
FIG. 22 is a top view of the second housing portion of the window balance assembly of FIG. 1.
Figure 23:
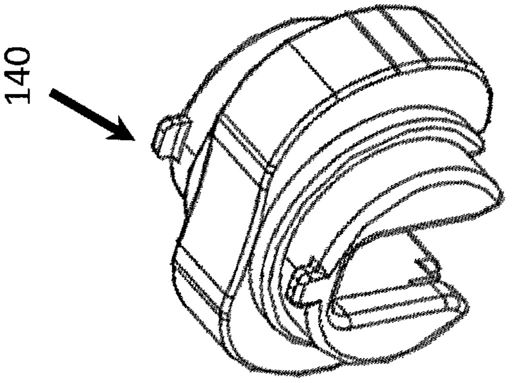
FIG. 23 is a first perspective view of the receiver of the window balance assembly of FIG. 1.

As seen in FIGS. 18-22, the housing portion 110 may be formed to include a side wall 105, which may extend from a first side 111 to a second side 112, and from a top 113 to a bottom 114, and which may generally be rectangular in shape. A shaped protrusion 115 may protrude from the upper portion of the side wall 105, beginning at, or beginning proximate to, the top 113. The shaped protrusion 115 may extend only a small portion of the way towards the bottom 114, and may extend from the second end 112 to just short of the first end 111, terminating at 111C, which offset may provide space for the second portion 152 of the coil spring 150 to exit from the housing assembly (see FIG. 29). The lower-most portion of the shaped protrusion 115 may terminate in a retaining surface 115R, which is intended to support one side of the convolutions of the curl spring 150. The retaining surface 115R may be a portion of a cylindrical surface, i.e., a horizontal cylinder segment, or alternatively may be a different surface or combination of surfaces that may provide at least two points of contact with one side (e.g., one-half) of the convolutions of the curl spring 150. For example, the retaining surface 115R may be formed to include a first surface 115A and a second surface 115B that may be generally flat but angled with respect to each other, and may be used to limit upward movement of the top of the convolutions of the curl spring 150. The first surface 115A and second surface 115B may be connected via a transition surface 115C. Alternatively, instead of using the shaped protrusion 115, two cylindrical pegs (not shown) may be configured to protrude from the wall 105 to provide support for, and inhibit upward movement of, the convolutions. Similarly, a shaped protrusion 116 may protrude from the middle-to-lower portion of the side wall 105, and may extend from the first side 111 to the second side 112. The shaped protrusion 116 may be constructed to include a retaining surface 116R that may be formed using any of the surface configurations mentioned above for the shaped protrusion 115. As seen in FIG. 20, the housing 110 is shown formed, merely to be exemplary, with a retaining surface 116R that may generally be a cylinder segment, and with a retaining surface 115R being formed of several disparate surface shapes. As may be understood from FIG. 20, a portion of the curl spring 150 may nest within, and be rotatably retained by, surfaces 115R and 116R. The side wall 105 of housing portion 110 may also be formed with an annular opening 105P, from which may protrude an annular protrusion 117 that may be sized to receive and rotatably support a first portion of the cylindrical surface 148 of receiver 140. The lower portion of the side wall 105 of housing portion 110 may also have one or more protrusions 118 that may form the bottom of the housing portion. The lower protrusion(s) 118 may have one or more apertures 118P formed therein, each being configured to receive a corresponding cylindrical protrusion that may be correspondingly formed on housing portion 120, to be usable in coupling the two housing portions together. Also, the upper protrusion 115 may have one or more apertures 115P formed therein, each being configured to receive a corresponding cylindrical protrusion on housing portion 120, also being usable to couple the two housing portions together. Each of the first side 111 and the second side 112 of the lower portion of the side wall 105 of housing portion 110 may be formed with an opening 105Pi and 105Pii, and corresponding cantilevered protrusions 119A and 119B that may protrude out from side wall 105. The cantilevered protrusions 119A and 119B may also extend down from the protrusion 116, and which may protrude out to plane 119*e* (FIG. 21), which may be farther away from side wall 105 than the distance that the protrusion 115 protrudes. The distal ends of the cantilevered protrusions 119A and 119B may therefore be free to flex outwardly when respectively driven (directly or indirectly) by the cams 146/147 of the receiver 140, as the sash window is rotated inwardly. The exterior surface of each of cantilevered protrusions 119A and 119B may be formed with a series of undulations 119Ua and 119Ub, which may better grip the interior of the sash window, when the cams 146/147 of the receiver 140 drive the cantilevered protrusions outwardly, to releasably support the sash window at a particular height. The top of the protrusion 115 may be formed to include a first keyway 115Ki and a second keyway 115Kii, which keyways may be used to couple (i.e., to piggyback) additional balance assemblies thereto, as discussed hereinafter (see e.g., FIGS. 48-49).

As seen in FIGS. 13-17, the housing portion 120 may be formed similar to the housing portion 110, with many of its features being a mirrored version of those on housing 110. The housing portion 120 may similarly be formed to include: a side wall 125 which may extend from a first side 121 to a second side 122, and from a top 123 to a bottom 124; a shaped upper protrusion 135 (with surfaces 135A, 135B, and 135C) being similar to protrusion 115; a shaped protrusion 136 (with surface 136R) protruding from the middle-to-lower portion of housing portion 120 being similar to protrusion 116; an annular opening 135P, from which may protrude an annular protrusion 137 that may be sized to receive, and rotatably support, the second portion of the cylindrical surface 148 of receiver 140; and one or more protrusions 138 being similar to the protrusion(s) 118 on housing portion 110, but instead having cylindrical protrusions 138P. The cantilevered protrusions 119A and 119B of housing portion 110 may be formed such they may be directly actuated by the cams 146/147 of the receiver 140, or alternatively, intermediate cantilevered members 139A and 139B may be formed on housing portion 120, and which may be directly actuated by the cams 146/147 of the receiver 140, and the cantilevered members 139A and 139B on housing portion 120 may in turn actuate the cantilevered protrusions 119A and 119B of housing portion 110, which may act as a brake for the sash window The housing portion 120 may also be formed to include a first keyway 135Ki and a second keyway 135Kii, being configured to align with the first keyway 115Ki and second keyway 115Kii of housing portion 110.

Assembly of the component parts of the window balance assembly 101 may be as follows.

Figure 28:
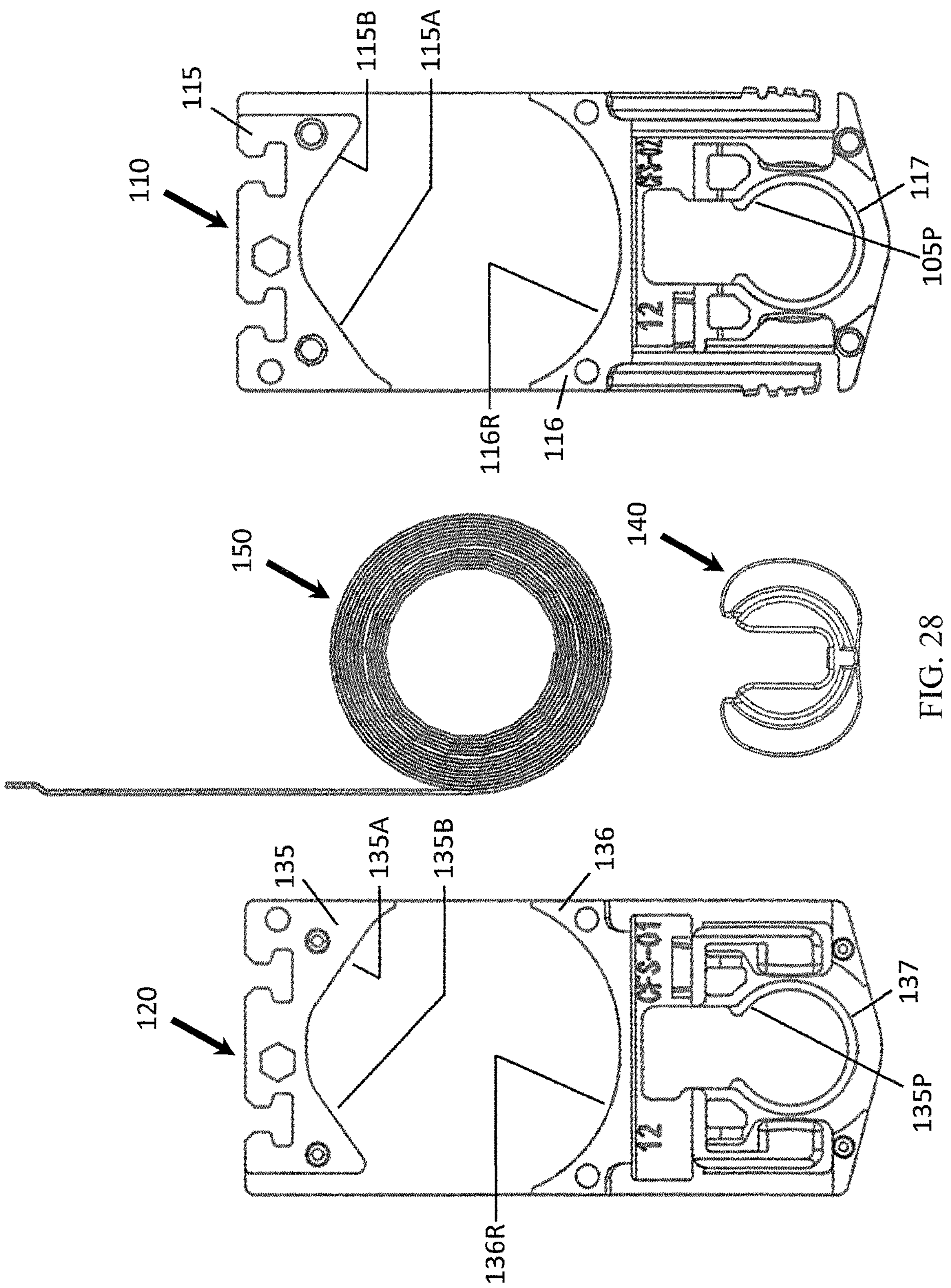
FIG. 28 shows the side views of the first housing portion, the curl spring, the receiver, and the second housing portion, prior to being assembled together.
Figure 29:
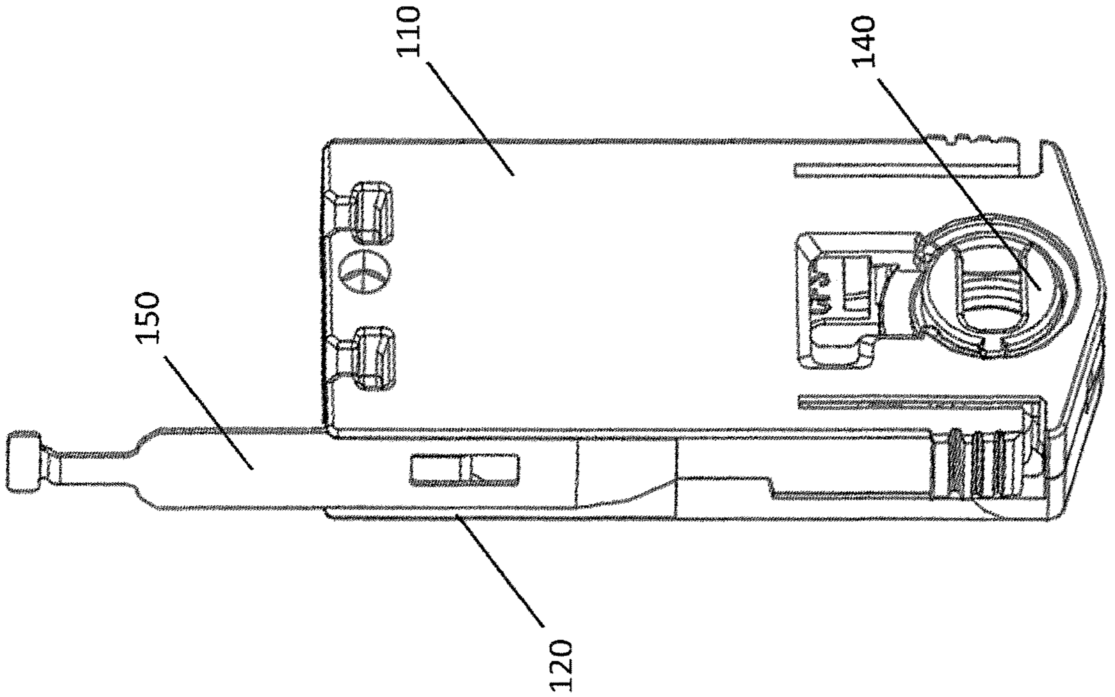
FIG. 29 shows the first housing portion, the curl spring, the receiver, and the second housing portion after being assembled together.
Figures 30, 31, 32, 33, 34, 35:
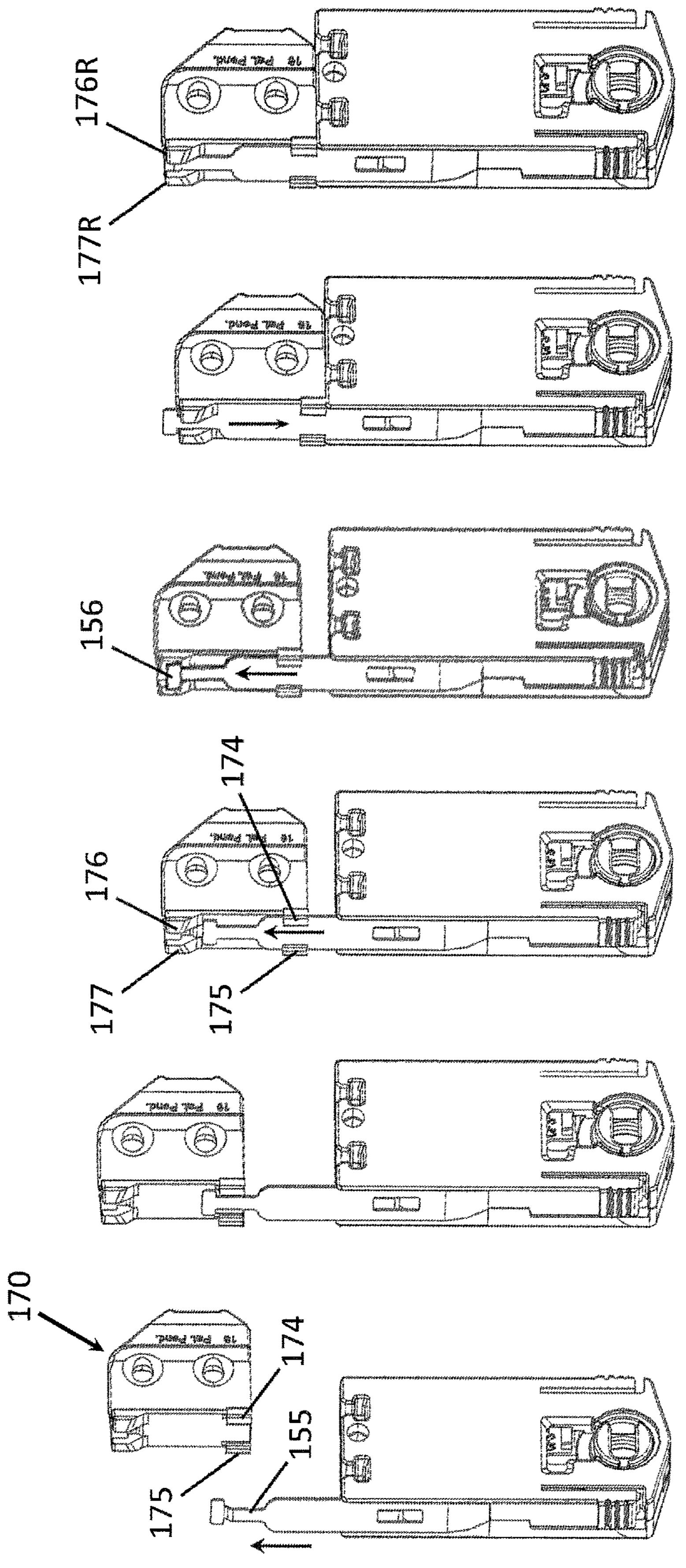
FIG. 30 shows the assembled housing portions, curl spring, and receiver, just prior to mating therewith of the mounting bracket.
FIG. 31 shows the assembled housing portions, curl spring, and receiver, just after the neck of the curl spring is nestled between the first guide member and second guide member of the mounting bracket.
FIG. 32 shows the assembled housing portions, curl spring, and receiver, after the head of the curl spring has been advance upwardly to reach the first and second ramp members, and the full width of the curl spring is then nestled between the first guide member and second guide member of the mounting bracket.
FIG. 33 shows the assembled housing portions, curl spring, and receiver, after the head of the curl spring has been advance further upwardly and is deflected away from the rear surface of the mounting bracket by riding up upon the first and second ramp members.
FIG. 34 shows the assembled housing portions, curl spring, and receiver, after the head of the curl spring has been advance further upwardly and is no longer in contact with and being deflected away from the rear surface of the mounting bracket by the first and second ramp members, and the neck of the curl spring tail is slidable received in the gap between the first ramp member and second ramp member.
FIG. 35 shows the assembled housing portions, curl spring, and receiver, after the curl spring has been allowed to bias the head downwardly until opposite sides of the head are respectively received within a recess in each of the first ramp member and second ramp member.
Figure 41:
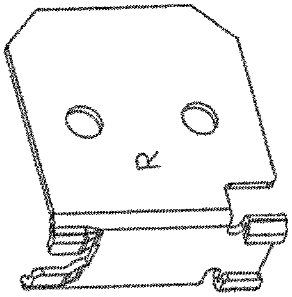
FIG. 41 is a first perspective view of an installation clip usable with the balance assembly of FIG. 1.
Figure 42:
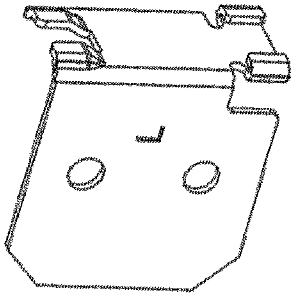
FIG. 42 is a second perspective view of an installation clip usable with the balance assembly of FIG. 1.
Figure 45:
FIG. 45 is a second end view of the installation clip of FIG. 41.
Figure 46:
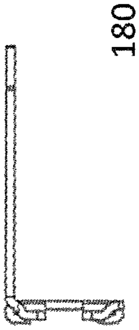
FIG. 46 is a top view of the installation clip of FIG. 41.
Figure 43:
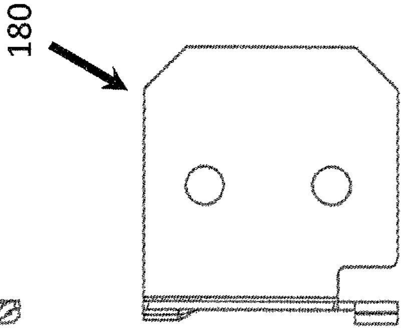
FIG. 43 is a side view of the installation clip of FIG. 41.
Figure 47:
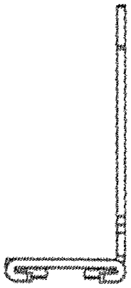
FIG. 47 is a bottom view of the installation clip of FIG. 41.
Figure 44:
FIG. 44 is a first end view of the installation clip of FIG. 41.

As may be understood from FIG. 28, first and second sides of the convolutions of the first portion 151 of the curl spring 150 may be disposed within the interior space created by the surfaces 115A, 115B, and 116R of protrusions 115 and 116 on housing portion 110 and the surfaces 135A, 135B, and 136R of protrusions 135 and 136 on housing portion 120. The two portions of the cylindrical surface 148 of receiver 140 may be rotatably received within a second interior space created by the opening 105P and protrusion 117 of housing 110 and by opening 135P and protrusion 137 of housing portion 120, and may be retained thereat by the protrusions 141P and 142P on the receiver. The curl spring 150, the receiver 140, and the housing portions 110 and 120 would thus be assembled together as seen in FIG. 29, with much of the second portion 152 of the curl spring 150 extending outside of the interior space formed by the two housing portions. The attachment of the mounting bracket 170 to the sub-assembly of FIG. 29 is shown in FIGS. 30-35. The neck 155 of the second portion 152 of the curl spring 150 may positioned as seen in FIG. 30, and may then be translated laterally to be positioned between the first and second guide members 174 and 175 on the rear surface 171R of the mounting bracket 170, as seen in FIG. 31. Next, as seen in FIG. 32, the curl spring 150 may be manually extended upwardly until the top of the head portion 156 reaches and contacts the ramp members 176 and 177, at which time the full width W1 of the curl spring 150 in nested within the first and second retaining members 174 and 175. Manually causing further upward movement of the curl spring results in the ramp members deflecting the head outwardly and away from the rear surface 171R, as seen in FIG. 33. Causing even further upward movement of the curl spring results in the head portion 156 passing beyond the ramp surfaces of the ramp members 176 and 177, and returning of the wide second portion 152 of the curl spring 150 back into contact with the rear surface 171R of the mounting bracket 170, as seen in FIG. 34. Thereafter, once the manual force that was used to elevate the curl spring 150 is released, the curl spring will naturally self-bias itself to re-curl into the two housing portions 110 and 120, and the two opposite sides of the bottom of the head portion 156 will be received within the respective recesses 176R and 177R of the first ramp member 176 and the second ramp member 177, as seen in FIG. 35. The length of the second portion 152 of the curl spring 150 may be selected to position the bottom of the mounting bracket 170 in proximity to, but just clear of being in contact with, the top of the housing portions 110/120. Alternatively, the curl spring may be configured to bias the bottom of the mounting bracket 170 into contact with the top surface of the housing portions 110/120. The fully assembled window balance assembly 101 is shown in the views of FIGS. 36-40.

The installation clip 180 shown in FIGS. 41-47 may be usable to mount the balance assembly of FIG. 1 to a portion of the window.

Figure 48:
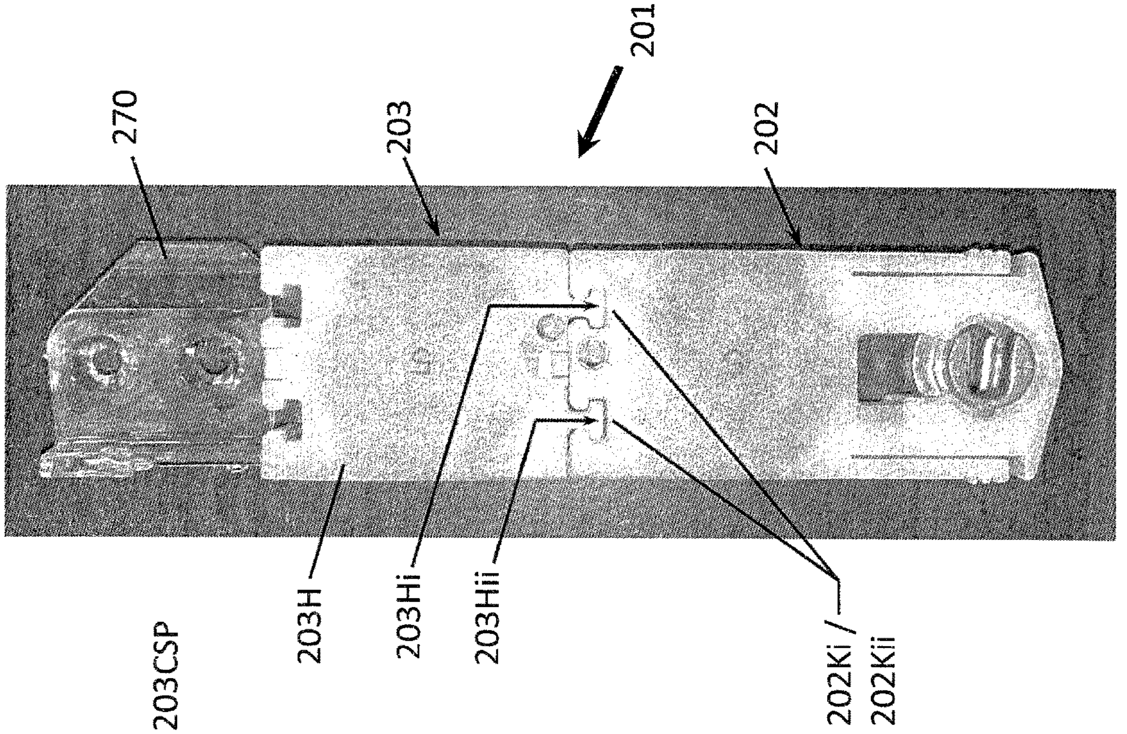
FIG. 48 is a side view of another window balance assembly embodiment.
Figure 49:
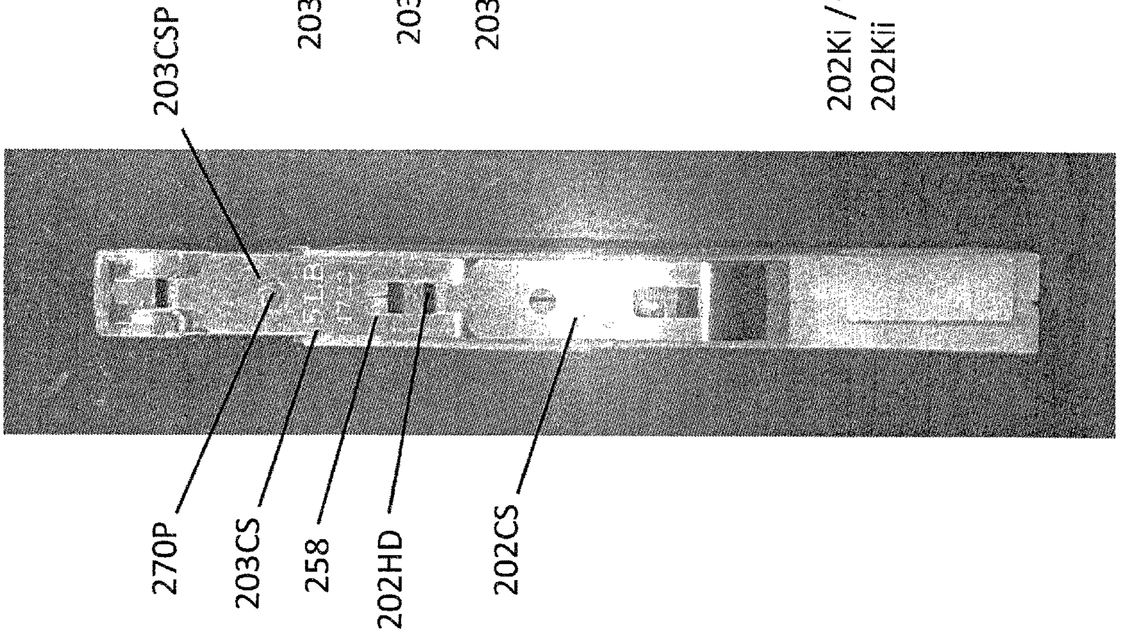
FIG. 49 is a rear view of the balance assembly of FIG. 48.

The side and rear views of FIGS. 48-49 show a window balance assembly 201, which may include a balance assembly 202 that may be formed similar to the window balance assembly 101 of FIG. 1 (including mounting bracket 270) but with a few differences, along with a balance subassembly 203. The subassembly 203 may be made of a curl spring 203CS, and a housing 203H that may have one or more lower protrusions (i.e., a key or keys 203Hi and 203Hii) that may permit its coupling to keyways formed similar to those of the housing portions 110 and 120 of the window balance assembly 101 (e.g., keyways 202Ki, and 202Kii). The head 202HD of the curl spring 202CS may be received within the opening 258 of the curl spring 203CS. Therefore, as the mounting bracket 270 is elevated by movement of the sash window, it is counterbalanced by the two leaf springs, which may provide double the supporting force (e.g., a total of 10 pounds instead of 5 pounds) and may thereby support a much heavier window. The mounting bracket 270 shown in FIG. 49 is formed without the ramp members and without the guide members used on the mounting bracket 170 of the window balance assembly 101. The mounting bracket 270 may instead use a spherical protrusion 270P which may be received in a corresponding aperture 203CSP in the leaf spring 203CS. The spherical protrusion 270P may have a horizontal recess, into which a portion of the leaf spring 202CS at its aperture may be received.

While illustrative implementations of one or more embodiments of the disclosed system are provided hereinabove, those skilled in the art and having the benefit of the present disclosure will appreciate that further embodiments may be implemented with various changes within the scope of the disclosed system. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

The invention claimed is:

1. A window balance assembly comprising:

a housing, said housing defining a first interior space and a second interior space;

a receiver, said receiver being rotatably supported in said first interior space and comprising: a cam;

a curl spring, said curl spring comprising: a first portion disposed within said second interior space and comprising a plurality of convolutions, and a second portion configured to extend outside of said second interior space; wherein said second portion comprises: a neck portion, and an elongated head portion, said elongated head portion being oriented transverse to said neck portion at a distal end of said neck portion;

a mounting bracket, said mounting bracket comprising:

a first flange;

a second flange;

a first guide member configured to protrude from a first side of a rear surface of said first flange;

a second guide member configured to protrude from a second side of said rear surface;

wherein each of said first guide member and said second guide member are configured to slidably receive said second portion of said curl spring and to maintain said second portion of said curl spring in proximity to said rear surface;

a first ramp member configured to protrude from said rear surface of said first flange;

a recess formed in a top of said first ramp member;

a second ramp member configured to protrude from said rear surface of said first flange;

a recess formed in a top of said second ramp member; and wherein said first ramp member and said second ramp member are spaced apart to form a gap configured to permit passage of said neck portion in said gap; and wherein said first ramp member and said second ramp member are configured to divert said head portion away from said rear surface, when said second portion of said curl spring slides between said first guide member and said second guide member, in proximity to said rear surface, until said head passes beyond said first ramp member and said second ramp member.

2. The window balance assembly according to claim 1, wherein when said head passes beyond said first ramp member and said second ramp member, said curl spring biases a first portion of said head into said first recess and a second portion of said head into said second recess, thereby nesting said neck in said gap.

3. The window balance assembly according to claim 2, wherein said housing comprises: a first elongated tab and a second elongated tab; and wherein said cam is configured to outwardly deflect a distal end of each of said first elongated tab and said second elongated tab when said receiver is rotated from a first position to a second position.

4. The window balance assembly according to claim 3, wherein said neck of said curl spring comprises: a joggle, said joggle positioned at a distal end of said neck, and said joggle configured to offset said elongated head portion a distance away from said neck portion.

5. The window balance assembly according to claim 4, wherein said second portion of said curl spring is formed to be substantially flat.

6. The window balance assembly according to claim 5, wherein a length of said head is greater than a width of said neck.

7. The window balance assembly according to claim 6, wherein a width of said neck is about half of a width of said first portion of said curl spring.

8. The window balance assembly according to claim 7, wherein a distance between outer sides of each of said first ramp member and said second ramp member is greater than said length of said head portion.

9. The window balance assembly according to claim 8, wherein said second flange is at a ninety-degree angle to said first flange.

10. The window balance assembly according to claim 9, wherein said second flange comprises: a first aperture and a second aperture, each of said first aperture and said second aperture having an axis being at a non-ninety-degree angle to said second flange.

11. The window balance assembly according to claim 10, wherein said housing comprises: a first cantilever member and a second cantilever member; and wherein when said receiver is rotated from a first position to a second position, said cam drives each of said first cantilever member and said second cantilever from a first portion to a second position to thereby protrude outwardly.

12. A window balance assembly comprising:

a housing;

a receiver, said receiver being rotatably supported in said housing;

a curl spring; said curl spring comprising: a plurality of convolutions, with a first end of said curl spring disposed within said plurality of convolutions; and a second of said curl spring comprising: a neck portion, and an elongated head portion, said elongated head portion being oriented transverse to said neck portion;

a mounting bracket, said mounting bracket comprising:

a first flange;

a second flange;

a first guide member configured to protrude from a first side of a rear surface of said first flange;

a second guide member configured to protrude from a second side of said rear surface;

wherein each of said first guide member and said second guide member are configured to slidably guide a portion of said curl spring and to maintain said portion of said curl spring in proximity to said rear surface;

a first ramp member configured to protrude from said rear surface of said first flange;

a recess formed in a top of said first ramp member;

a second ramp member configured to protrude from said rear surface of said first flange;

a recess formed in a top of said second ramp member; and wherein said first ramp member and said second ramp member are spaced apart to form a gap configured to permit passage of said neck portion in said gap; and wherein said first ramp member and said second ramp member are configured to divert said head portion away from said rear surface, when said portion of said curl spring slides between said first guide member and said second guide member, in proximity to said rear surface, until said head passes beyond said first ramp member and said second ramp member.

* * * * *